United States Patent [19]
Czurak et al.

[11] 3,989,470
[45] Nov. 2, 1976

[54] APPARATUS FOR THE PRODUCTION OF FOAMED FERTILIZERS

[75] Inventors: Richard H. Czurak, Marysville; Robert M. Thompson, Richwood, both of Ohio

[73] Assignee: O. M. Scott & Sons Company, Marysville, Ohio

[22] Filed: Dec. 11, 1972

[21] Appl. No.: 314,262

Related U.S. Application Data

[63] Continuation-in-part of Ser. No. 850,489, Aug. 15, 1969, Pat. No. 3,705,794.

[52] U.S. Cl. ............................ 23/259.3; 23/285; 34/201; 34/236; 260/2.5 F; 260/69 R
[51] Int. Cl.² ................................. C05C 9/02
[58] Field of Search ............ 23/259.3, 259.1; 71/28, 71/29, 64 R, 64 PC; 198/201; 241/186 R; 210/400; 34/201; 137/101.19, 413; 260/2.5 F, 69 R; 264/DIG. 2

[56] References Cited
UNITED STATES PATENTS

| | | | |
|---|---|---|---|
| 2,572,413 | 10/1951 | Wickland | 241/186 R |
| 2,592,809 | 4/1952 | Kralovec | 71/28 X |
| 2,766,283 | 10/1956 | Darden | 71/28 X |
| 2,845,401 | 7/1958 | Gilliam | 71/28 X |
| 2,867,233 | 1/1959 | Adelson | 137/413 |
| 2,913,330 | 11/1959 | Wilson | 23/259.1 X |
| 3,076,700 | 2/1963 | Renner | 23/259.3 X |
| 3,145,727 | 8/1964 | Yamashita | 137/413 |
| 3,161,522 | 12/1964 | Compton | 210/400 |
| 3,226,097 | 12/1965 | Vayda, Jr. et al. | 259/21 X |
| 3,231,363 | 1/1966 | Renner | 71/28 |
| 3,255,161 | 6/1966 | Cobb, Jr. | 23/253 R |
| 3,306,861 | 2/1967 | Justice | 260/2.5 F |
| 3,312,666 | 4/1967 | Knipp et al. | 23/252 R X |
| 3,345,304 | 10/1967 | Ross | 23/260 |
| 3,374,751 | 3/1968 | Werner | 34/201 |
| 3,438,385 | 4/1969 | Nogami | 137/101.19 |
| 3,464,809 | 9/1969 | Hicks | 71/64 R X |
| 3,469,676 | 9/1969 | Wheeler | 198/201 |
| 3,474,815 | 10/1969 | Beahm et al. | 137/101.19 |
| 3,537,584 | 11/1970 | MacDonald | 210/196 |
| 3,558,299 | 1/1971 | Baskin | 71/28 |
| 3,697,245 | 10/1972 | Dilday | 71/28 |

*Primary Examiner*—Morris O. Wolk
*Assistant Examiner*—Arnold Turk
*Attorney, Agent, or Firm*—Strauch, Nolan, Neale, Nies & Kurz

[57] ABSTRACT

Particulate foamed fertilizers and combination products in which other active ingredients are combined with such fertilizers. Methods and apparatus for making foamed fertilizers and combination products in which provision is made for combining ingredients, curing, drying, and comminuting the material thus obtained, separating and agglomerating fines and adding them to the comminuted product, and incorporating active ingredients into the comminuted product.

24 Claims, 12 Drawing Figures

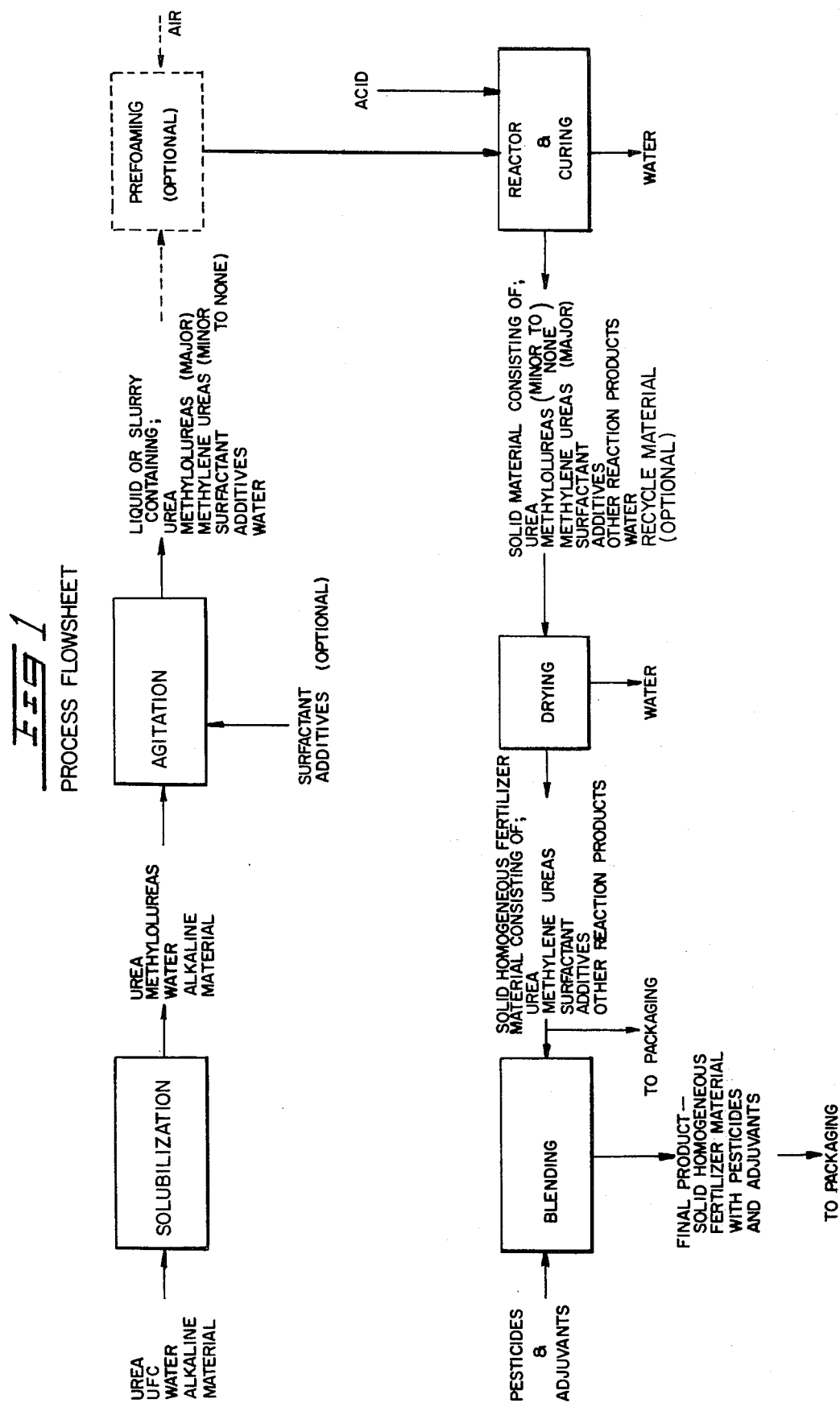

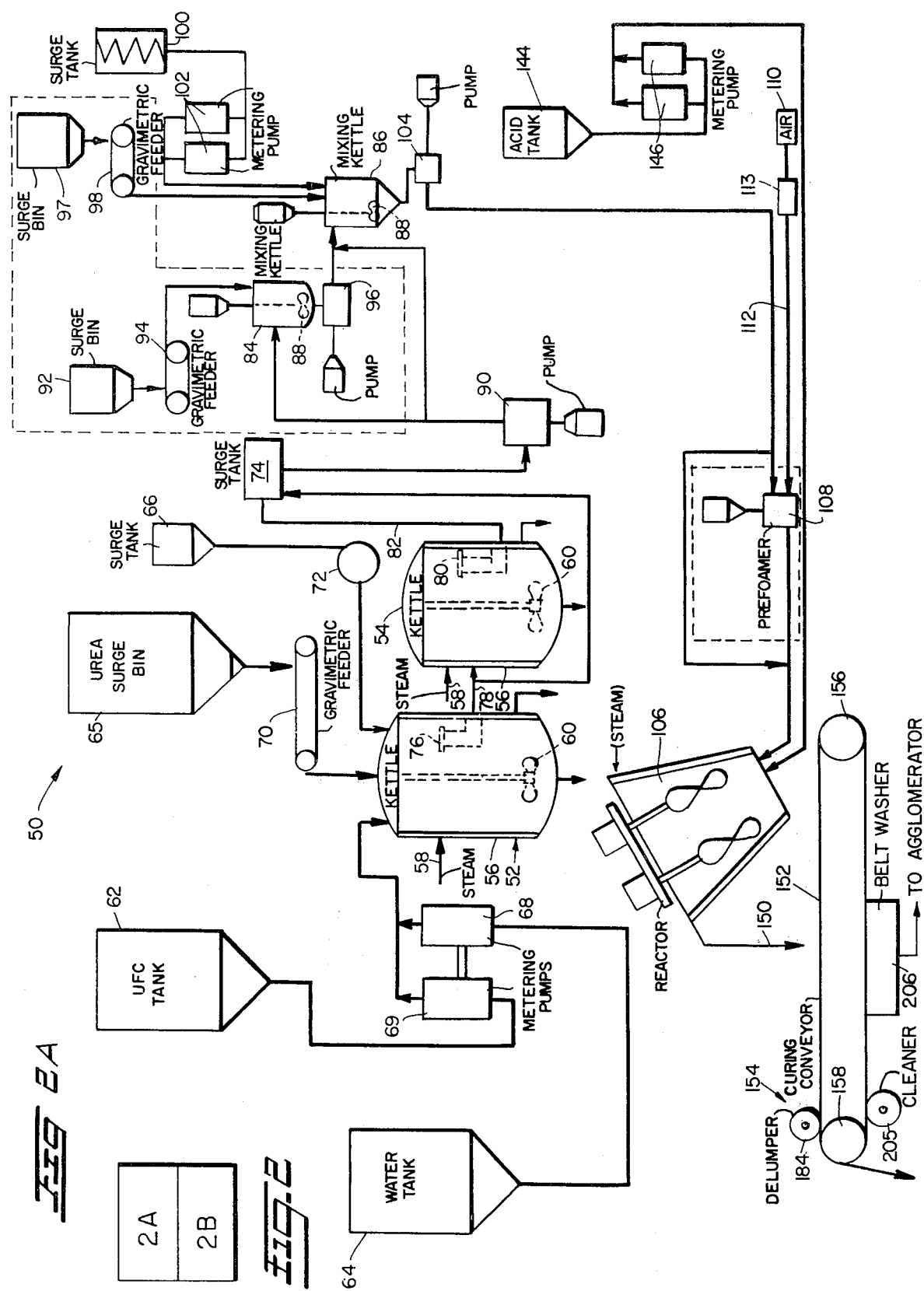

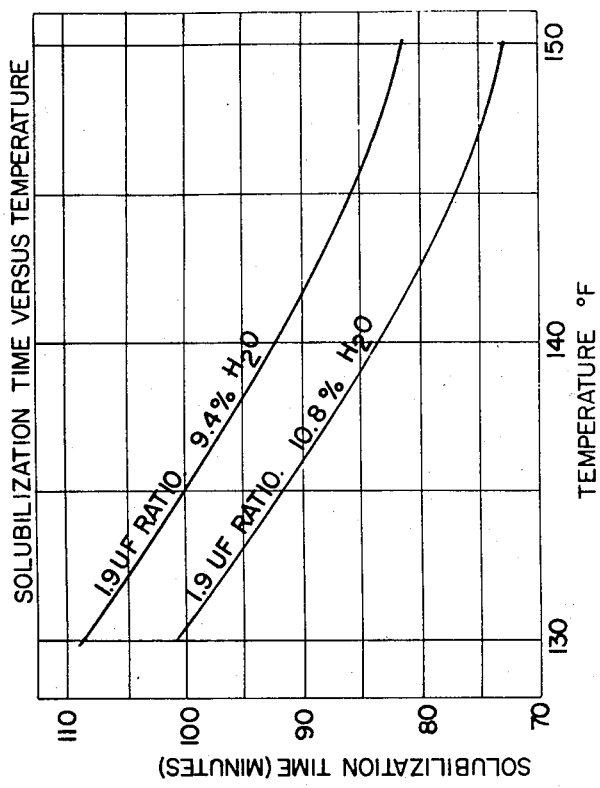
_Fig. 10_
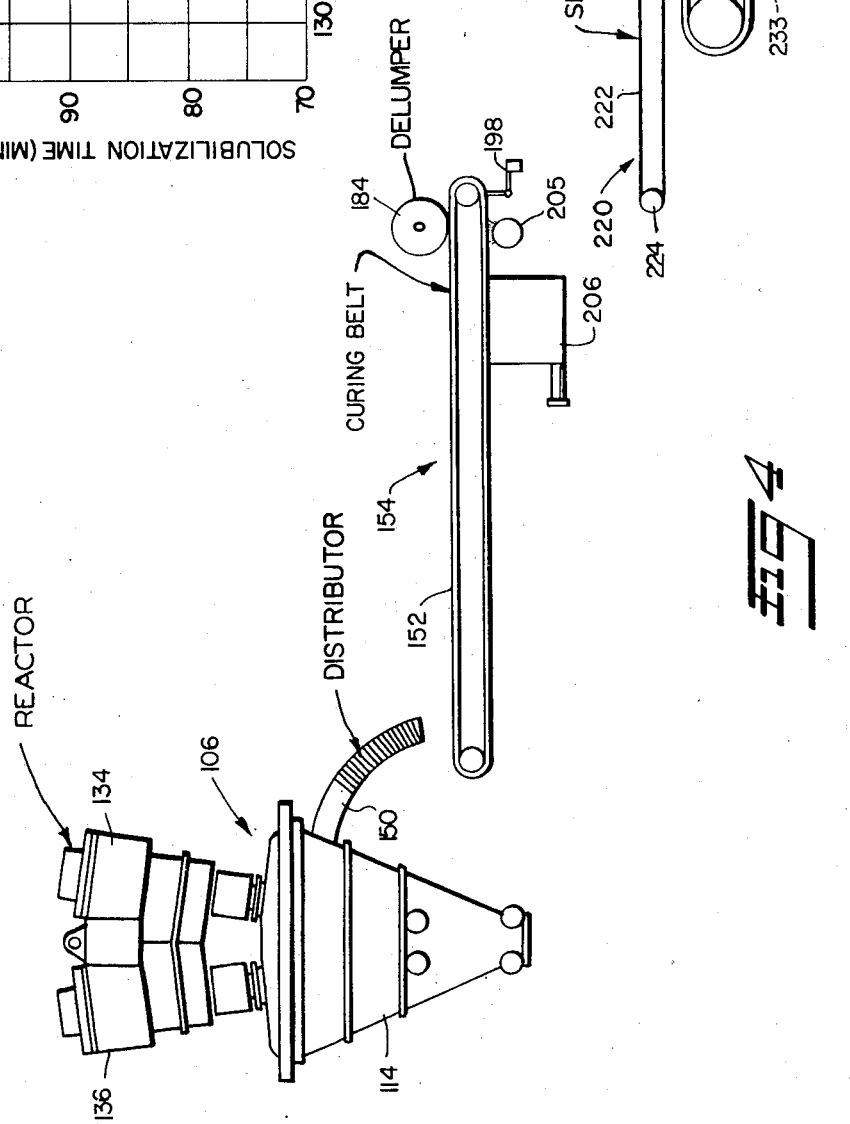
_Fig. 4_

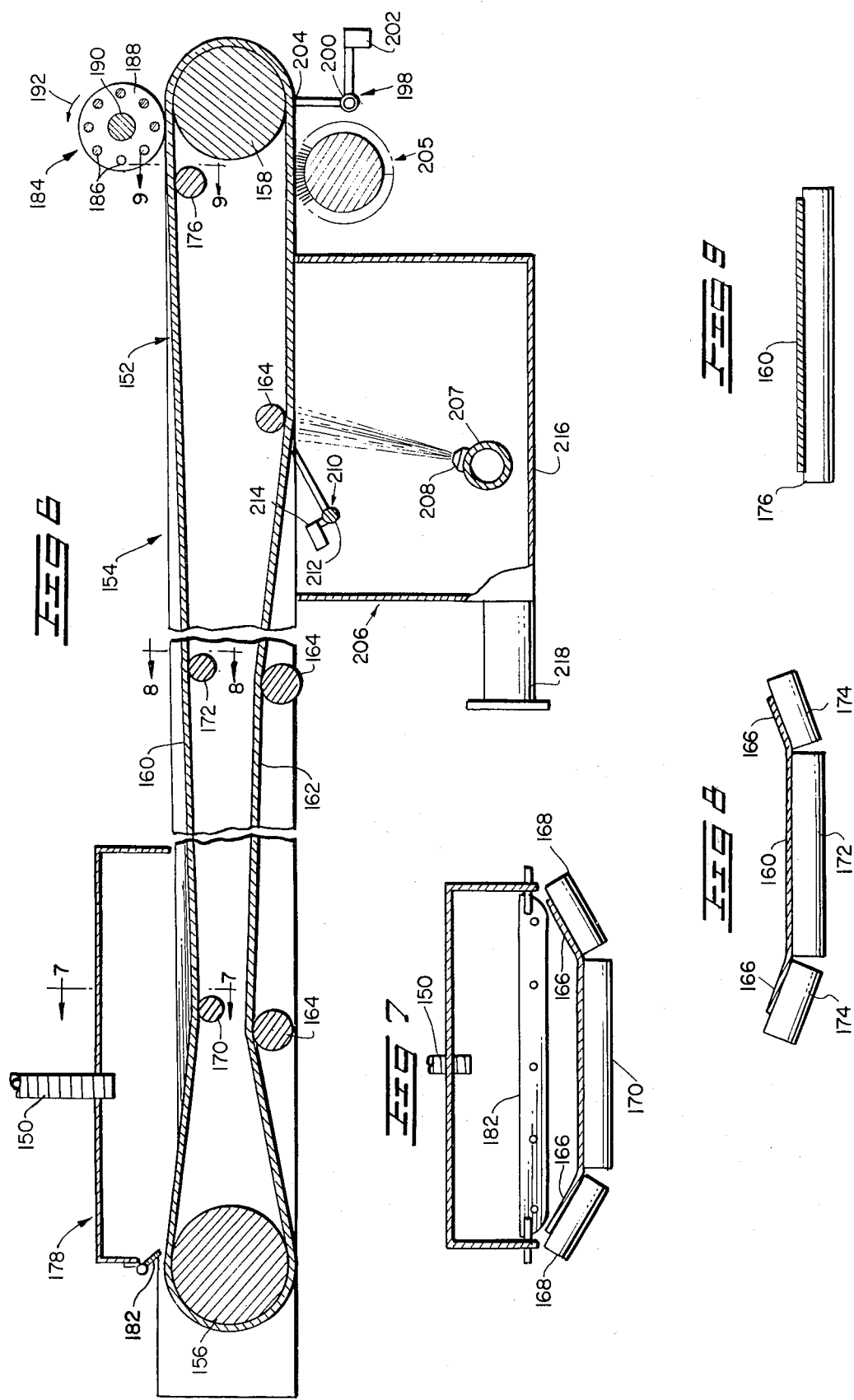

APPARATUS FOR THE PRODUCTION OF FOAMED FERTILIZERS

The present application is a continuation-in-part of application Ser. No. 850,489 filed Aug. 15, 1969, now U.S. Pat. No. 3,705,794.

This invention relates to novel, improved methods of and apparatus for producing particulate, foamed, urea-formaldehyde fertilizers and combination products; i.e., products in which one or more additional active ingredients are incorporated into the particles or granules of foamed fertilizer as well as to the resulting products.

One of the primary objects of the present invention is the provision of novel improved urea-formaldehyde fertilizers and combination products which are particularly suited for application to turf areas as well as novel methods of and apparatus for producing such fertilizers and combination products.

Foamed urea-formaldehyde fertilizers and combination products and their production have been previously disclosed in U.S. Pat. No. 2,231,363 issued Jan. 25, 1966 to Victor A. Renner for PROCESS FOR MAKING FOAMED UREA-FORMALDEHYDE FERTILIZER. Another important and primary object of the present invention is the provision of foamed urea-formaldehyde fertilizers which are improvements of those described in U.S. Pat. No. 3,231,363 and the provision of methods and apparatus for producing foamed ureaformaldehyde fertilizers which constitute improvements in the method and apparatus disclosed in U.S. Pat. No. 3,231,363.

Other important but more specific objects of the present invention reside in the provision of novel, improved, granular, foamed urea-formaldehyde fertilizers and combination products:

1. which have a high degree of physical stability;
2. which have a low bulk density and are therefore easily handled;
3. which have a relatively low hygroscopicity and are accordingly non-caking and free-flowing;
4. which are capable of providing a controlled release of available nitrogen;
5. in which there is ready availability but a controlled release of additional fertilizers or other active ingredients.

Additional important, specific objects of the invention reside in the provision of novel apparatus and processes for producing granular, foamed urea-formaldehyde fertilizers:

1. which are suitable for commercial scale production rates;
2. which can be utilized to produce fertilizers having available $K_2O$ and/or $P_2O_5$ values as well as straight nitrogen fertilizers;
3. which can be employed to produce combination products as well as straight fertilizers;
4. which can produce fertilizers and combination products capable of meeting the objectives specified above.

Additional important objects, further advantages, and other features of the present invention will become apparent from the appended claims and as the ensuing detailed description and discussion proceeds in conjunction with the accompanying drawing, in which:

FIG. 1 is a flow diagram of a process for producing fertilizers and combination products in accord with the principles of the present invention;

FIG. 4 is a generally diagrammatic illustration of a reactor, curing section, and dryer incorporated in the apparatus of FIG. 1;

FIG. 6 is a longitudinal section through the curing section;

FIG. 7 is a section through the curing section, taken substantially along line 7—7 of FIG. 6;

FIG. 8 is a section through the curing section, taken substantially along line 8—8 of FIG. 6;

FIG. 9 is a section through the curing section, taken substantially along line 9—9 of FIG. 6; and FIG. 10 is a graph of solubilization time versus temperature for the preparation of methylol ureas solutions having different water—urea-formaldehyde ratios in accord with the present invention.

Figure 2B:
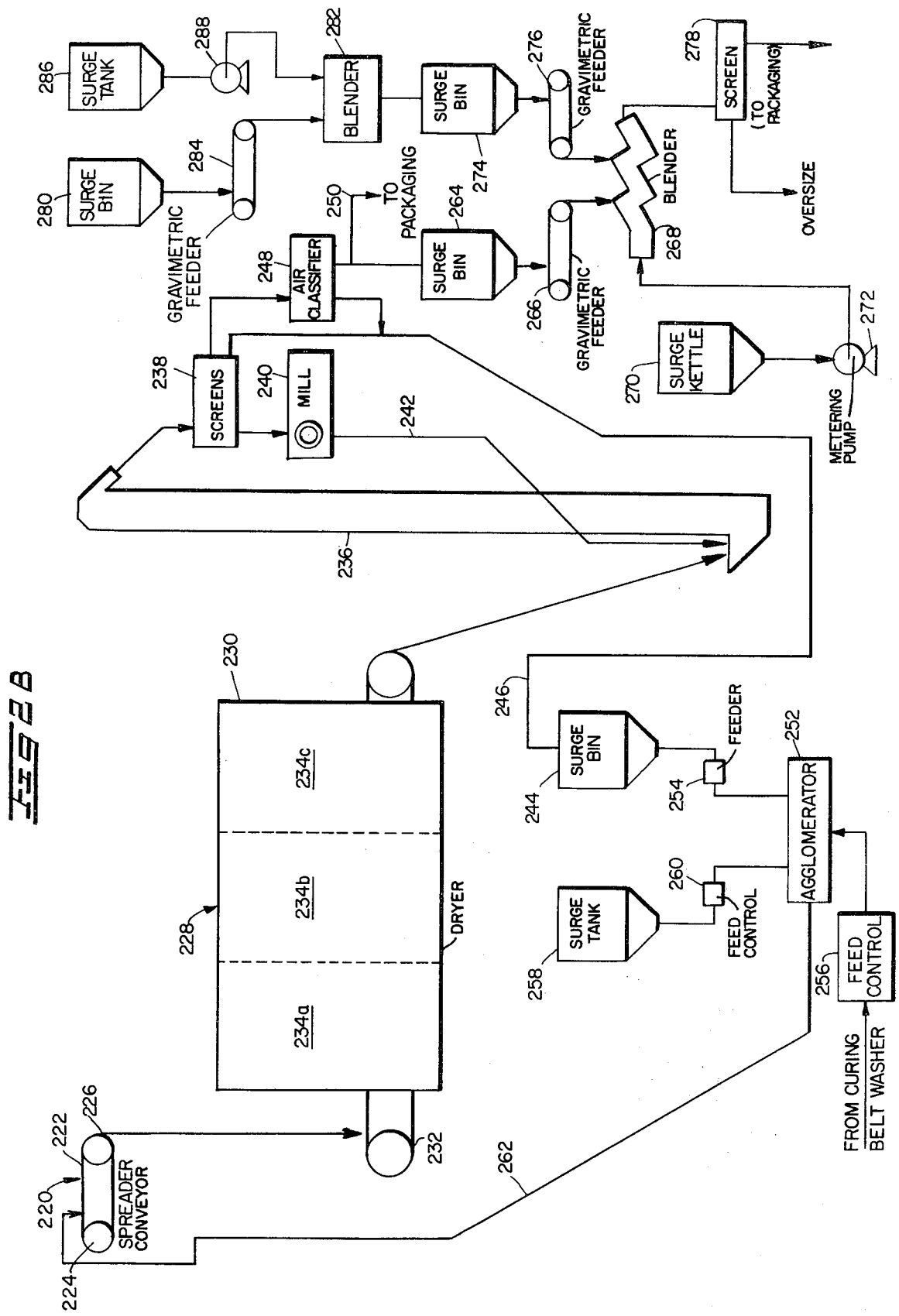
FIG. 2 is a diagram showing the relationship of FIGS. 2A and 2B which together constitute a schematic diagram of apparatus for producing foamed urea-formaldehyde fertilizers and combination products in accord with the present invention.

Referring now to FIG. 1 of the drawing the present invention is concerned with the production of slow release fertilizers (i.e., fertilizers typically having a nitrogen availability index of 45–55% and one-half to one-third of the nitrogen in cold water insoluble form) and to the production of combination products employing such fertilizers. The initial step in the production of the novel fertilizers and combination products of the present invention is the preparation of an aqueous solution of methylol ureas in which the ratio of urea to formaldehyde is in the range of 1.3:1 to 2.4:1. This may be done by dissolving solid urea and a urea-formaldehyde concentrate in water at a temperature in the range of 130° to 160° F. The pH of the methylol ureas solution thus prepared is kept in the range of 7.0 to 10.5 by addition of a caustic material such as sodium hydroxide.

It is not critical that a particular urea-formaldehyde concentrate be employed. One suitable concentrate is UFC-85, which is supplied by Allied Chemical Company and contains about 25 percent urea and 60 percent formaldehyde.

The urea-formaldehyde ratio and the temperature and pH ranges are all important in the production of the urea-formaldehyde fertilizers and combination products of the present invention. Specifically, if the ratio of urea to formaldehyde is reduced below 1.3:1, the nitrogen availability index of the resulting product is unacceptably low. On the other hand, if the urea to formaldehyde ratio is increased to about 2.4:1, the nitrogen availability index becomes unacceptably high. In this regard one of the objectives of the present invention is the production of a fertilizer with gradual release characteristics, i.e., one from which the available nitrogen is released over an extended period of time. If the nitrogen availability index of the product is too high, this characteristic will not be obtained. Instead, substantially all of the nitrogen will become immediately available when the nitrogen is applied.

Also, if the urea-formaldehyde ratio is raised above the maximum specified above, it may become impossible to obtain the desired self-granulating characteristics. Other production difficulties may also arise.

If the solubilization temperature is reduced appreciably below the 130° F. minimum specified above, the free urea can not be dissolved in a feasible period of time and in fact may even not go into solution at all, depending on the water content of the methylol ureas solution.

On the other hand if the solubilization temperature is increased significantly above the 160° F. maximum specified above for the urea-formaldehyde ratios necessary to produce a useable product, condensation of the methylol ureas to methylene ureas may ocur to a significant extent. This is obviously unacceptable at the solubilization stage of the process since it produces a highly viscous material which is difficult to handle. Also, the condensation reactions can be better controlled at a later point in the process to produce a final product with better characteristics further making it undesirable for these reactions to occur in the solubilization step.

In conjunction with the foregoing the amount of water in which the urea is dissolved is also of considerable importance. If the water-urea ratio is reduced too low, the urea can not be dissolved in a feasible period of time even at the maximum solubilization temperature specified above. The importance of the water-urea ratio on solubilization time is further demonstrated by FIG. 10 which shows that a 15 percent increase in this ratio significantly decreased the solubilization time over the range of temperatures covered by the Figure.

It is also important that the water-urea ratio not be too high.

With respect to the limits within which the pH of the methylol ureas solution is maintained, if the pH of the solution is permitted to drop below 7.0, the unacceptable condensation of the methylol ureas to methylene ureas referred to above will occur. On the other hand if the pH of the methylol ureas solution is permitted to exceed the specified maximum of 10.5 the physical and chemical characteristics of the final product may be adversely effected due to as yet unidentified changes in the condensation reactions which occur later in the process.

Referring again to FIG. 2, the methylol ureas solution prepared in the manner just described may be foamed and the condensation of the methylol ureas to methylene ureas initiated directly after the preparation of the solution. It is preferred, however, that a surfactant first be added to the solution. Also, in many cases it is desirable to first add potassium and phosporous values to the solution so that the end product will be a complete fertilizer, i.e., one containing N, P, and K values.

The potassium and phosphate materials are preferably added stepwise to the methylol ureas solution since it has been found that this produces a much more uniform distribution of the additives than can be obtained if the materials are added at the same time. Also, it is preferred that the phosphate providing material be added after the potassium source. This is because phosphates useful as fertilizers typically have an acid pH. Accordingly, such materials tend to initiate the condensation of the methylol ureas so that foaming has to be initiated within a very short period of time after the addition of the phosphate source. It is accordingly impractical to mix other additives with the methylol ureas solution after the phosphate source is added.

There are a number of suitable sources of both potassium and phosphate. Potassium sources include potassium sulfate, potassium chloride, potassium phosphate, and potassium nitrate. Many phosphates of both natural and synthetic origin may be employed in the novel fertilizers and combination products disclosed herein although it is preferred that a source having a pH of 5.0 or higher be employed to avoid unwanted condensation of the methylol ureas. A number of suitable phosphate sources are described in COMMERCIAL FERTILIZERS, Collings, 5th Edition, 1955, McGraw-Hill, New York, New York, which is hereby incorporated herein. Another suitable phosphate material is Mon-A-Mon. This is a mixture of ammonium phosphates having an analysis of 13-52-0, which is available from the Agricultural Chemicals Marketing Division of the Tennessee Corporation.

In conjunction with the preceding paragraph, fertilizer analyses used herein are those of the conventional type; i.e., a series of three numbers representing, respectively, percentage of total nitrogen, percentage of available phosphorous calculated as $P_2O_5$, and percentage of available potassium calculated as $K_2O$.

Irrespective of the potassium or phosphate source which is selected, the material is preferably milled to minus 40 U.S. mesh before it is mixed with the methylol ureas solution or employed in liquid form. This facilitates pH control and even distribution of the additive in the methylol ureas solution.

The proportions of potassium and phosphate containing materials employed will depend primarily upon the desired analysis of the final product. There is, however, a limit upon the amounts which can be employed. If the amount of potassium containing material and/or the phosphate containing material exceeds this limit, the methylol ureas solution can not be foamed because all of the methylol ureas is tied up as a binder, leaving none in which cellular development can occur. Typically, from 0 to 60 parts of potassium calculated as $K_2O$ and 0 to 60 parts of phosphorous calculated as $P_2O_5$ will be employed per 100 parts by weight of urea-formaldehyde solution.

The temperature at which the additives are introduced into the methylol ureas solution is also of considerable importance. More specifically, in a typical application of the present invention a Mon-A-Mon slurry will be added to the methylol ureas solution to provide phosphorous values in the in the final product. It has been found that variations of only a few degrees Fahrenheit in the Mon-A-Mon slurry temperature will effect the solution to such an extent that condensation of the methylol ureas can not be obtained to the extent desired without major adjustments in other parameters affecting the reaction.

Other adjuvants including fertilizer ingredients and trace elements can be incorporated in the methylol ureas solution at the same time as or in lieu of the potassium and/or phosphate sources, if desired, to impart specific properties to the final product. Representative fertilizer materials which may be employed include those capable of supplying iron, manganese, boron, molybdenum, magnesium, copper, zinc, iodine, calcium, and/or sulfur. These elements may be added in their elemental form, or their salts or chelates may be employed.

As indicated above, the steps just described are preferably followed by the addition of a surfactant to the methylol ureas solution. In this regard one of the objectives of the novel process disclosed herein is the production of a self-granulating foam; i.e., one which will tend to separate into granules as it cures. It has been found that this tendency as well as the foaming of the methylol ureas solution can be promoted by the addition of a surfactant to the solution.

Virtually any anionic or non-ionic surfactant may be employed in the practice of the present invention. Two satisfactory surfactants are Calsoft F-90 and Calsoft L-60 which are manufactured by the Pilot Chemical Company and are respectively a biodegradable dodecylbenzene sodium sulfonate flake and liquid. Other suitable anionic and non-ionic surfactants are listed in DETERGENTS AND EMULSIFIERS UP-TO-DATE, 1968 by John W. McCutcheon, Inc., 236 Mount Kemble, Morristown, New Jersey, which is hereby incorporated by reference herein.

The surfactant is preferably added to the methylol ureas solution in an amount ranging from about 0.05 to about 2–3 percent by weight of the solution. The proportion of surfactant added is of considerable importance in the practice of the present invention. Specifically, if less than 0.05 percent is added, the solution can not be satisfactorily foamed, which means the desired low bulk density of the final product can not be obtained. Also, the foamed solution will not have the desired self-granulating characteristics. On the other hand, if the maximum specified percentage of 2–3 percent is exceeded, production costs are increased without any beneficial changes in the final product. Furthermore, the final product will be gummy and tacky and therefore difficult to handle and distribute from a spreader. Also, there will be an undesirable reduction in the plant food content of the final product. Within the specified range the amount of surfactant employed will depend upon the desired physical characteristics of the final product.

The methylol ureas-surfactant solution with or without the additives just discussed is preferably subjected to a prefoaming step although this step is in most cases not essential and can therefore be omitted, if desired. The reason for employing the prefoaming step is that products having lower bulk densities can be made if it is used. Specifically, when a prefoaming step was used, products having bulk densities as low as 15–20 pounds per cubic foot or lower could be produced in one installation for making products of the character described herein. When prefoaming was not employed the lowest bulk densities that could be obtained for the same products were on the order of 5–10 pounds per cubic foot higher. The lower bulk densities produced by the inclusion of the prefoaming step in the process are desirable in that the product can be more easily distributed at desired application rates by conventional spreaders and other dry applicators.

Prefoaming is achieved by agitation of the methylol ureas solution for a period in the range of 1–10 seconds. Also, air may be introduced into the solution, preferably at a rate such that the prefoamed material is up to 50–75 percent air, to promote foaming of the solution. With agitation only products with bulk densities in the range of 2–3 pounds per cubic foot lower than those produced without prefoaming can be obtained. By using air in combination with agitation this can be reduced to 5–10 lbs. per cubic foot lower than those produced without agitation.

The next step in the novel process disclosed herein is to reduce the pH of the methylol ureas solution to promote condensation of the methylol ureas to methylene ureas. This is accomplished by agitating the methylol ureas solution and simultaneously adding an acidic material to it to catalyze the condensation reactions. Typically, the catalyst will be dilute sulfuric acid although phosphoric acid and other acidic materials may be employed instead, if desired. The catalyst will be introduced at a temperature in the range of 120°–140° F.

In conjunction with the foregoing, phosphoric acid may in some instances be preferred since its catalytic effect is not as great as that of sulfuric acid. Therefore, variations in the rate at which the acid is added have a less pronounced effect on the reaction and the final product.

In a typical application of the present invention the methylol ureas solution will be introduced into the vessel in which the condensation reaction is promoted at a pH of 5–8.5 or higher. Sufficient catalyst is added to the solution during agitation to reduce its pH to 3.5–6.5 by the time the agitation is completed. Reduction of the solution pH to a value in the range specified above is important in determining the characteristics of the final product. Specifically, if the discharge pH is too low, the material will not expand properly in the subsequent curing step. Also, the final product will have an unacceptably low nitrogen availability index.

On the other hand, if the discharge pH is above the specified upper limit, the condensation reactions will not proceed to the desired extent. As a result, solids will settle out. Also, the material will not exhibit self-granulating characteristics in the subsequent curing step, and will be gummy or sticky.

It is also important in initiating the condensation reaction that the degree of agitation, temperature of the methylol ureas solution, and holdup or residence time (i.e., the time for which the solution is agitated) be maintained with specified limits.

More particularly, it is important that the temperature of the solution be maintained below a maximum of 220° F. while the methylol ureas solution is agitated. If the temperature of the agitated methylol ureas solution is allowed to exceed this maximum, the material sets up in and clogs the reactor. It is also important that the solution be heated to a temperature of at least 135° F. during the agitation step. If this temperature is not reached, the reaction will not be complete with the adverse results discussed above.

The primary objectives of agitating the methylol ureas solution are to intimately mix the acidic catalyst with the methylol ureas and to keep the solution homogeneous and any additives uniformly dispersed in the solution (by the time that the material is discharged from the reactor its viscosity is sufficiently high that the additives will not settle out because the additives can migrate only very slowly through the material; and the discharged material rapidly increases in viscosity to a level where the additives cannot, as a practical matter, migrate at all). The minimum degree of agitation requires is that necessary to achieve those objectives. This minimum will change depending upon the specific product being made and the type of equipment in which it is agitated. However, it has been found that, in agitating the solution in one type of vessel having revolving agitators which proved satisfactory, on the order of 46 agitator revolutions per minute were required to produce sufficient mixing of the catalyst and methyl ureas solution. At lower agitator speeds the condensation reaction was unstable. Also, it was found that additional acid was required to produce a material having the same physical characteristics as those produced with greater agitation. This was undesirable because the result of using the additional acid was a final product with an unacceptably low nitrogen availability index.

The maximum agitation which can be employed is that which will not produce physical degradation of the material being agitated. In the reactor referred to in the preceding paragraph agitation speeds of up to 200 revolutions per minute have been employed without degradation of the material.

In general greater agitation is preferred since this permits the proportion of acid catalyst to be reduced. The result is a higher pH at the discharge side of the reactor and a product with a higher nitrogen availability index. However, increased agitation produces a denser, closer grained material which is generally less desirable, or even one with a continuous, solid structure, so that the advantages obtained by greater agitation are to some extent offset by the appurtenant disadvantages.

With respect to residence time, in many cases the consumption of acid can be materially decreased by increasing the length of the agitation period. This is desirable as the result is a product having a higher pH and improved nitrogen availability characteristics.

In conjunction with the foregoing it was pointed out above that a prefoaming step is employed in the process of the present invention if products of relatively low density are to be prepared. The importance of the prefoaming step was demonstrated by tests in which air was introduced into the agitated solution as the acid catalyst was being added in an attempt to foam the material without employing a prefoaming step. However, the introduction of air into the reactor did not have any effect on the bulk density of the final product. Also, this caused an undesirable intermittent discharge of the catalyzed solution from the reactor.

Referring again to FIG. 2, a curing step follows the condensation reaction initiating step just described. In this step the material is spread into a layer typically having an initial thickness in the range of one to six inches.

Curing will typically be continued at a temperature in the range of 180° to 220° F. for a period of at least 1 minute to insure that the condensation of methylol ureas to methylene ureas is at least substantially completed, and to produce a physically stable material which can be easily handled. During this period the bed of material expands to three or four times its original depth, resulting in a significant reduction in the bulk density of the material. Also, during the curing step the material separates into granules and into larger lumps consisting of only loosely cohered granules. That is, it is during the curing step that the self-granulating characteristics of the novel products of the present invention becomes apparent. This characteristic is of considerable importance since it significantly reduces the amount of comminution later required with a consequent decrease in the production of fines, which must be reprocessed to produce particles of usable size.

The various parameters in the curing step described above are all of considerable importance. Specifically, if the initial bed thickness is not maintained at the specified minimum, the cellular structure of the material will collapse, and the cured product will have a dense non-porous structure rather than the desired porous cellular formation. In addition the cured product will have a "gummy" characteristic, making it difficult to handle. Further, the bed of material will not contain the heat of reaction to the extent necessary for completion of the condensation reactions. As a result, the final product will not have satisfactory fertilizer (i.e., nitrogen availability) characteristics. On the other hand, if the bed is too thick, the bottom portion of the bed will collapse. The result will be a solid bottom layer of material surmounted by a layer of foam.

With respect to the curing temperature the condensation reactions are exothermic. Accordingly, if the bed is maintained at the specified minimum depth, no heat need be added during the curing step. Accordingly, it is the temperature at which the material is introduced into the bed (i.e., the reactor discharge temperature) which is of importance. Specifically, it is preferred that this temperature be maintained in the range of 135° to 220° F.

As indicated above, the minimum curing time is in one aspect that required to produce a readily handleable product. While the material may exhibit a solid appearance after curing for as short a period as 15 seconds, depending upon its pH, it will still be gummy and difficult to handle until cured for the additional period prescribed above.

It is also important that agitation of the material be avoided during the initial stages of the curing step. Such agitation hinders the desired development of a cellular structure in the curing material and can even cause the cake or bed of material to collapse.

At the end of the curing step the material will typically have a moisture content in the range of 16 to 22 percent. The cured material is dried to reduce this to a maximum on the order of 4 percent. First, however, the material is preferably delumped (i.e., broken up) so that the maximum diameter of the dryer feed does not exceed 0.5–1.0 inch. Larger lumps cannot be dried effectively; and, moreover, such lumps also hamper subsequent milling and screening steps.

It is preferred that the delumped material be dried by passing it through drying zones maintained at successively lower temperatures and that the temperature of the material being dried not be allowed to exceed 200° F. Drying times will typically range from 15 to 25 minutes.

With respect to the maximum temperature specified above, temperatures in excess of that specified will cause polymerization reactions which result in a sharp decrease in the nitrogen availability of the final product or in the evolution of ammonia. The product will accordingly be unsatisfactory as a fertilizer.

In a typical drying operation in accord with the present invention the delumped material is passed seriatim through three or four drying zones. The temperature in the zones may be varied with somewhat lower temperatures being employed to dry materials having lower urea-formaldehyde ratios.

The specified maximum moisture content of the dried product is also important in the practice of the present invention. If the product is not dried to the specified limit it will exhibit a decided tendency to cake. Also, the product will be difficult to mill and screen.

The delumped material is dried in a thin layer, typically on the order of 2 inches thick. This thickness has produced the best results as far as uniformity of drying is concerned. The optimum thickness of the material layer will vary, however, depending upon the particular type of drying equipment employed.

The dried material is milled to reduce the oversize lumps to particles in the desired size range so that the product can be distributed by available spreaders. This is followed by removal of oversize and undersize particles from the milled material. The remaining material is ready for packaging.

Oversize material is recycled through the milling and classification steps. Fines are agglomerated to produce particles of useful size by blending them with an agglomerating agent and introducing the agglomerated material into the feed to the dryer.

Suitable agglomerating agents are water and ureaformaldehyde solutions with water being preferred as it produces better agglomeration. Of importance in the agglomeration step are the proportion of agglomerating agent, the retention time in the blender, and the degree of agitation in the blender. A correlation between retention time and the amount of water required for acceptable agglomeration has been found to exist with less water being required when longer retention times are employed. For example, in one series of tests, similar results were obtained under each of the following conditions:

| Percent of Water Added (Based on Weight of Fines) | Retention Time (Minutes) |
|---|---|
| 16.2 | 21 |
| 18 | 8.4 |
| 20 | 6.3 |
| 21–22 | 0.16 |

Generally speaking, longer retention times and lower percentages of water are preferred since high water addition rates result in a material which is difficult to dry and, also, in the production of a large proportion of oversize (plus 8 mesh) particles. In fact, because of the difficulties associated with the use of higher rates, water addition rates in the range of 18–19 percent are preferred although rates in the range of 16–23 percent have successfully been employed.

Agglomeration will typically be accomplished in a paddle mixer.

Urea-formaldehyde solutions useful as agglomerating agents are those having urea to formaldehyde ratios in the range of 2.4:1 to 1.3:1. Such resins will typically be employed in proportions ranging from 15–30 percent with lower proportions being preferred as build-up of the resin in the blender may occur at higher rates.

In conjunction with the foregoing the curing of the methylol ureas solution will typically be carried out on an endless belt as will be described in more detail hereinafter. The curing material tends to adhere to this belt and must accordingly be removed. One step which may be employed to clean the belt is to direct jets of water against it to wash away the adherent urea-formaldehyde material. This produces an aqueous urea-formaldehyde solution which can be used as the agglomerating agent. The use of this solution is advantageous as it solves the problem of disposing of the water and also reclaims economically significant amounts of the urea-formaldehyde material.

Referring again to FIG. 1, it was pointed out above that the novel process disclosed herein can be employed to make combination products as well as straight fertilizers. In the production of combination products the active constituent(s) and/or adjuvant(s) may be blended directly with the fertilizer product obtained from the milling and classification steps. Alternatively, a sticking agent and the constituents to be added may be first blended and the resulting preblend then blended with the fertilizer product.

Generally speaking, there is no limitation on the type of constituents which may be incorporated in the combination products of the present invention. Constituents which may be advantageously added to make such products more useful include, without limitation: herbicides, fungicides, growth regulators, insecticides, nematocides, insect and animal repellants, soil sterilants, trace elements, fertilizers, and adjuvants such as dyes, spreaders, diluents, and conditioning agents. Examples of compounds in the foregoing classes which may be usefully employed are listed in the above mentioned U.S. Pat. No. 3,231,363 and in the following publications, all of which are hereby incorporated by reference herein: CHEMISTRY OF THE PESTICIDES (3d Ed), Frear, D. Van Nostrand Company, Inc., New York, New York; WEED CONTROL (2d Ed), Robbins et al, McGraw-Hill Book Company, Inc., New York, New York; COMMERCIAL FERTILIZERS (5th Ed), Collings, McGraw-Hill Book Company, Inc., New York, New York; and FARM CHEMICALS 1969 HANDBOOK, Meister Publishing Company, Willoughby, Ohio.

Both liquid and solid constituents may be incorporated in the combination products of the present invention. Solids are preferably screened and/or otherwise treated, if necessary, to eliminate large lumps so that the constituents will be uniformly distributed in the final product.

There are numerous sticking agents which may be employed in the preblend and also in the final blending step to promote adherence of the constituents to the fertilizer particles. Examples of suitable sticking agents and polybutene; polyhydric alcohols such as ethylene, propylene, dipropylene, triethylene, and hexylene glycols; 2,2-diethyl-1,3-propanediol; 2-ethyl-2-butyl-1,3-propanediol; 1,5-pentanediol; and 2-ethyl-1-1,3-hexanediol as well as the higher molecular weight polyethylene and polypropylene glycols.

Stoddards solvent and similar liquids may also be used as the sticking agent.

Other sticking agents which have been found to provide suitable results are: glycol ethers such as ethylene glycol monoethyl ether; ethylene glycol monomethyl ether; 1-butoxyethoxy-2-propanol; diethylene glycol monoethyl ether; diethylene glycol monomethyl ether; diethylene glycol monobutyl ether; methoxytriglycol; and ethoxytriglycol and low volatile ketones such as methyl ethyl ketone and diisobutylketone. Other compounds may of course be employed. The requisite characteristics for sticking agents are described in more detail in U.S. Pat. Nos. 3,076,699 and 3,083,089 issued to Victor A. Renner Feb. 5, 1963, and Mar. 26, 1963, respectively, which are hereby incorporated by reference herein.

The preblend is sprayed or gravimetrically fed onto the fertilizer product in a zig-zag or similar blender to insure an even distribution of the added constituent or constituents. Surprisingly, it has been found that retention time in the blender has little effect on the uniformity of the final product. Accordingly, short retention times are preferably employed as this maximizes the processing capacity of the blending equipment.

In conjunction with the foregoing the method of making combination products just described represents a significant advance over the technique described in the above-mentioned U.S. Pat. No. 3,231,363 in which additives are incorporated directly into the fertilizer itself. More particularly, in the products of the present invention, the added constituents are more readily released upon application of the product, which is advantageous in many circumstances.

The following examples describe more explicitly the production of fertilizers and combination products by the process described above.

EXAMPLE I

A complete fertilizer having a 32-6-4 analysis was prepared by the process described above from a urea-formaldehyde solution having a urea-formaldehyde ratio of 1.9:1.0, using phosphoric acid to initiate the condensation reaction. The materials and proportions in which they were employed are as follows:

| MATERIAL | PARTS BY WEIGHT |
|---|---|
| Urea (45 % nitrogen) | 53.16 |
| Urea-formaldehyde solution (11 % nitrogen) | 26.98 |
| Mon-A-Mon (12 % nitrogen, 52 % $P_2O_5$) | 10.07 |
| Potassium sulfate (50 % $K_2O$) | 6.71 |
| Phosphoric acid (40 % solution of $H_3PO_4$ in water) | 2.26 |
| Surfactant (Calsoft L-60, 60 % aqueous solution) | 0.81 |

All of the solid ingredients except the ureas were of -40 mesh size.

Chemical analysis of the product after drying to a 1.7% moisture content indicated 32.1% total nitrogen, 6.9% available $P_2O_5$, and 4.6% available $K_2O$. Approximately 49.8% of the nitrogen was cold water insoluble, and the product had a desirable nitrogen availability index of 40.8

Screen analysis of the product gave approximately 96% in the range of −8 +70 mesh. Less than 4% was −70 mesh.

EXAMPLE II

A complete fertilizer having 31-6-4 analysis was prepared by the process described above from a urea-formaldehyde solution having a urea-formaldehyde ratio of 1.5:1.0 using dilute sulfuric acid to initiate the condensation reaction. The materials and proportions employed were:

| MATERIAL | PARTS BY WEIGHT |
|---|---|
| Urea (45 % nitrogen) | 49.57 |
| Urea-formaldehyde concentrate (11 % nitrogen) | 31.72 |
| Mon-A-Mon (12 % nitrogen, 52 % $P_2O_5$) | 9.97 |
| Potassium sulfate (50 % $K_2O$) | 7.09 |
| Sulfuric acid (20 % aqueous solution of $H_2SO_4$) | 1.23 |
| Calsoft L-60 (60 % aqueous solution) | 0.42 |

The resulting fertilizer product had the following properties:

| CHEMICAL ANALYSIS | |
|---|---|
| 4.2 % moisture | 62.3 % cold water insoluble nitrogen |
| 31.6 % nitrogen | 35.7 nitrogen availability index |
| 6.6 % available $P_2O_5$ | |
| 4.1 % water soluble $K_2O$ | |
| SCREEN ANALYSIS | |
| 94 %:−8 +70 mesh | |
| Less than 5 % was −70 mesh | |

EXAMPLE III

A complete fertilizer having a 31-6-4 analysis was prepared by the process of the present invention from a urea-formaldehyde solution having a urea-formaldehyde ratio of 1.3:1.0 using dilute sulfuric acid to initiate the condensation reaction. The materials and proportions employed were:

| MATERIAL | PARTS BY WEIGHT |
|---|---|
| Urea (45 % nitrogen) | 45.94 |
| Urea-formaldehyde concentrate (11 % nitrogen) | 36.46 |
| Mon-A-Mon (12 % nitrogen, 52 % $P_2O_5$) | 6.76 |
| Potassium sulfate | 9.67 |
| Sulfuric acid (20 % aqueous solution of $H_2SO_4$) | 0.85 |
| Calsoft L-60 (60 % aqueous solution) | 0.32 |

The resulting fertilizer product had the following properties:

| CHEMICAL ANALYSIS | |
|---|---|
| 2.8 % moisture | 74.8 % cold water insoluble nitrogen |
| 31.0 % nitrogen | 31.0 % nitrogen availability index |
| 6.1 % available $P_2O_5$ | |
| 4.3 % available $K_2O$ | |
| SCREEN ANALYSIS | |
| 95 %:−8 +70 mesh | |
| Less than 4 % was −70 mesh | |

EXAMPLE IV

A complete fertilizer having a 32-6-3 analysis was prepared by the process described above from a urea-formaldehyde solution having a urea-formaldehyde ratio of 1.5:1.0 using dilute sulfuric acid to initiate the condensation reaction, potassium nitrate as the source of available $K_2O$, and a different surfactant. The materials and proportions employed were:

| MATERIAL | PARTS BY WEIGHT |
|---|---|
| Urea (45 % nitrogen) | 49.07 |
| Urea-formaldehyde concentrate (11 % nitrogen) | 31.81 |
| Mon-A-Mon (12 % nitrogen, 52 % $P_2O_5$) | 7.60 |
| Potassium nitrate (13 % nitrogen, 44 % $K_2O$) | 8.60 |
| Sulfuric acid (25 % aqueous solution of $H_2SO_4$) | 2.67 |
| Surfactant (Calsoft F-90, 90 % active material) | 0.25 |

The resulting fertilizer product had the following properties:

| CHEMICAL ANALYSIS | |
|---|---|
| 0.6 % moisture | 55.1 % cold water insoluble nitrogen |
| 32.5 % nitrogen | |
| 6.0 % available $P_2O_5$ | |
| 3.3 % available $K_2O$ | |
| SCREEN ANALYSIS | |
| 95 %: −8 +70 mesh | |
| Less than 4 % was −70 mesh | |

EXAMPLE V

A complete fertilizer having a 33-6-4 analysis was prepared by the process of the present invention from a urea-formaldehyde solution having a urea-formaldehyde ratio of 1.5:1.0, using potassium nitrate as the source of available $K_2O$ and ammonium polyphosphate as a source of available $P_2O_5$ and as a catalyst to initiate the condensation reaction. The materials and proportions employed were:

| MATERIAL | PARTS BY WEIGHT |
|---|---|
| Urea (45 % nitrogen) | 49.98 |
| Urea-formaldehyde concentrate (11 % nitrogen) | 32.40 |
| Ammonium polyphosphate (11 % nitrogen, 58 % $P_2O_5$) | 10.43 |
| Potassium nitrate (13 % nitrogen, 44 % $K_2O$) | 6.95 |
| Calsoft F-90 | 0.24 |

The resulting fertilizer product had the following properties:

| CHEMICAL ANALYSIS | |
|---|---|
| 3.7 % moisture | 63.4 % cold water insoluble nitrogen |
| 33.1 % nitrogen | 30.3 % nitrogen availability index |
| 6.6 % available $P_2O_5$ | |
| 4.7 % available $K_2O$ | |
| SCREEN ANALYSIS | |
| 95 %:−8 +70 mesh | |
| Less than 5 % was −70 mesh | |

EXAMPLE VI

A complete fertilizer having a 32-5-4 analysis was prepared by the process described above from a urea-formaldehyde solution having a urea-formaldehyde ratio of 1.3:1.0 using dilute sulfuric acid to initiate the condensation reaction, potassium nitrate as the source of available $K_2O$, and ammonium phosphate as the source of available $P_2O_5$. The materials and proportions employed were:

| MATERIAL | PARTS BY WEIGHT |
|---|---|
| Urea (45 % nitrogen) | 53.52 |
| Urea-formaldehyde concentrate (11 % nitrogen) | 26.76 |
| Ammonium phosphate (10 % nitrogen, 55 % $P_2O_5$) | 8.10 |
| Potassium nitrate | 10.05 |
| Sulfuric acid (15 % aqueous solution of $H_2SO_4$) | 1.30 |
| Calsoft F-90 | 0.27 |

The resulting fertilizer product had the following properties:

| CHEMICAL ANALYSIS | |
|---|---|
| 6.0 % moisture | 40.7 % cold water insoluble nitrogen |
| 32.7 % nitrogen | 38.8 % nitrogen availability index |
| 5.3 % available $P_2O_5$ | |
| 4.1 % available $K_2O$ | |
| SCREEN ANALYSIS | |
| 95 %:−8 +70 mesh | |
| Less than 5 % was −70 mesh | |

EXAMPLE VII

A complete fertilizer having a 32-7-4 analysis was prepared by the process of the present invention from a urea-formaldehyde solution having a urea-formaldehyde ratio of 1.5: 1.0 using phosphoric acid to initiate the condensation reactions and potassium metaphosphate as the source both of available $P_2O_5$ and available $K_2O$. The materials and proportions employed were:

| MATERIAL | PARTS BY WEIGHT |
|---|---|
| Urea (45 % nitrogen) | 53.34 |
| Urea-formaldehyde concentrate (11 % nitrogen) | 34.98 |
| Potassium metaphosphate (58 % $P_2O_5$, 36 % $K_2O$) | 10.49 |
| Phosphoric acid (40 % aqueous solution of $H_3PO_4$) | 0.84 |
| Calsoft F-90 | 0.35 |

The resulting product had the following properties:

| CHEMICAL ANALYSIS | |
|---|---|
| 2.0 % moisture | 59.4 % cold water insoluble nitrogen |
| 32.8 % nitrogen | 45.8 % nitrogen availability index |
| 7.75 % available $P_2O_5$ | |
| 4.67 % availabe $K_2O$ | |
| SCREEN ANALYSIS | |
| 96 %: −8 +70 mesh | |
| Less than 3 % was −70 mesh | |

EXAMPLE VIII

A straight nitrogen fertilizer having 38-0-0 analysis was prepared by the process described above from a urea-formaldehyde solution having a urea-formaldehyde ratio of 1.3:1.0 using dilute sulfuric acid to initiate the condensation reaction. The materials and proportions employed were:

| MATERIAL | PARTS BY WEIGHT |
|---|---|
| Urea (45 % nitrogen) | 45.94 |
| Urea-formaldehyde concentrate (11 % nitrogen) | 36.46 |
| Sulfuric acid (15 % aqueous solution) | 1.16 |
| Calsoft F-90 | 0.33 |

The resulting fertilizer product had the following properties:

| CHEMICAL ANALYSIS | |
|---|---|
| 1.4 % moisture | 65.3 % cold ater insoluble nitrogen |
| 38.1 % nitrogen | 38.3 % nitrogen availa- | bility index
SCREEN ANALYSIS
95 %: −8 +70 mesh
Less than 4 % was −70 mesh

EXAMPLE IX

A combination product including a complete fertilizer and 2,4-D and Banvel D (2-methoxy-3,6-dichlorobenzoic acid) was prepared by forming a preblend of the foregoing pesticides (both of which were obtained from the supplier in liquid form) and a sticking agent and blending the preblend with fertilizer prepared as described in Example II in an 8 inch Patterson-Kelly liquid-solids zig-zag blender. The materials and proportions employed were as follows:

| MATERIALS | WEIGHT |
|---|---|
| −8 +70 mesh, 31-6-4 Fertilizer of Example II | 720 lbs |
| Banvel D (88 % active material) | 710 gms |
| 2,4-D (Technical grade) | 3748 gms |
| Sticking agent (hexylene glycol) | 17700 gms |

The blending conditions and feed rates were:

| | |
|---|---|
| Fertilizer feed rate | 8 lbs/min. |
| Pesticide-sticking agent preblend feed rate | 246 gms/min. |
| Blender speed | 30 rpm |
| Blender orientation (feed end higher than discharge end) | 3° 24' |
| Retention time in blender | 3.26 mins. |

The resulting combination product had a bulk density of 28.7 lbs/cu.ft. Ninety-four and five-tenths (94.5) percent of the product was of the desired −8 + 70 mesh particle size.

The average analysis of sample taken at 5-minute intervals was: 2,4-D, 1.16%; Banvel D, 0.25%.

The foregoing combination product is intended for applications where a product providing plant nutrients and broad leaf weed control can be used to advantage.

EXAMPLE X

A different combination product was prepared from a fertilizer as described in Example II, Enide (N,N-dimethyl-2,2-diphenylacetamide), Neburon (1-N-butyl-3-(3-4-dichlorophenyl)-1-methylurea), Sevin (1-napthyl-N-methylcarbamate), and a sticking agent. The pesticides, all of which were obtained from the suppliers in the form of particulate solids, were preblended in a twin shell Patterson-Kelly dry chemical blender. The preblend, sticking agent, and fertilizer were then blended in a zig-zag blender as described in Example IX. The materials and proportions employed were:

| MATERIAL | WEIGHT |
|---|---|
| −8 +70 mesh 31-6-4 Fertilizer of Example II | 225 lbs |
| Enide (90 % active material) | 4340 gms |
| Neburon (94 % active material) | 800 gms |
| Sevin (85 % active material) | 2018 gms |
| Sticking agent (Polyvis OSH, which is a polybutene having a molecular weight of approximately 400 manufactured by the Cosden Oil and Chemical Company) | 7550 gms |

The blending conditions and feed rates were:

| | |
|---|---|
| Fertilizer feed rate | 5 lbs/min. |
| Pesticide preblend feed rate | 159 gms/min. |
| Sticking agent feed rate | 168 gms/min. |
| Blender speed | 30 rpm |
| Blender orientation (feed end higher than discharge end) | 2° 42' |
| Retention time in blender | 5.5 mins. |

The resulting combination product had a bulk density of 33.1 lbs/cu.ft. Eighty-nine and twenty-eight one-hundredths (89.28) percent of the product was of the desired −8 +70 mesh particle size even before agglomeration of fines. Samples taken at four minute intervals had the following average analysis: Enide, 3.63%; Sevin, 2.00%; Neburon, 0.60%.

This product is particularly useful on dichondra for applications requiring fertilization plus insect control and control of grassy weeds such as *Poa annua* and broad leaf weeds such as chickweed and oxalis.

EXAMPLE XI

Another combination product intended for fertilization plus fungus control, was prepared from fertilizer as described in Example II, PMA (phenylmercuricacetate), Thiram (bis-(dimethyl-dithiocarbamoyl)-disulfide), a conditioning agent, and a sticking agent. The PMA dissolved in the sticking agent, and the conditioning agent was blended with the Thiram in a twin shell Patterson-Kelly blender as described in Example X. The PMA solution, Thiram preblend, and fertilizer were then blended in a zig-zag blender as described in Example IX. The materials and weight used were:

| MATERIAL | WEIGHT |
|---|---|
| −8 +70 mesh 31-6-4 Fertilizer of Example II | 315 lbs |
| PMA (95 % active material) | 927 gms |
| Thiram (99 % active material) | 6080 gms |
| Conditioning agent (Hi Sil, which is a precipitated, amorphous, hydrated silica available from PPG Industries, Inc., and is employed in the product to prevent caking of the Thiram and facilitate uniform distribution of the Thiram in the fertilizer) | 189 gms |
| Sticking agent (hexylene glycol) | 19400 gms |

The blending conditions and feed rates were:

| | |
|---|---|
| Fertilizer feed rate | 7 lbs/min. |
| PMA-sticking agent solution | 449 gms/min. |
| Thiram-conditioning agent preblend | 139 gms/min. |
| Blender speed | 30 rpm |
| Blender orientation (feed end higher than discharge end) | 1° 40' |
| Retention time in blender | 3.9 mins. |

The resulting combination product had a bulk density of 32.4 lbs/cu.ft. Ninety-four and six-tenths (94.6)

percent of the product was of the desired −8 +70 mesh particle size. The average active ingredient content of samples taken at 4 minute intervals was: Thiram, 2.93%; PMA, 0.49%

EXAMPLE XII

A combination product, which is useful for fertilization plus chinch bug control, was prepared from fertilizer as described in Example II, Ethion (0,0,0,0'-tetraethyl-S,S'-methylenebisphosphorodithioate, and a sticking agent. The Ethion (obtained in liquid form) was mixed with the sticking agent, and the resulting preblended was blended with the fertilizer in a zig-zag blender as described in Example IX. The materials and the weights in which they were employed were:

| MATERIAL | WEIGHT |
| --- | --- |
| −8 +70 mesh Fertilizer of Example II | 940 lbs |
| Ethion (95 % active material) | 7060 gms |
| Sticking agent (hexylene glycol) | 2075 gms |

The blending conditions and feed rates were:

| | |
| --- | --- |
| Fertilizer feed rate | 7.5 lbs/min. |
| Preblend feed rate | 202 gms/min. |
| Blender speed | 30 rpm |
| Blender orientation (feed end higher than discharge end) | 1° 34' |
| Retention time in blender | 4 mins. |

The resulting combination product had a bulk density of 31.6 lbs/cu.ft. Eighty-eight and six-tenths (88.6) percent of the product was of the desired −8 +70 mesh particle size even before agglomeration of fines. Samples taken at 4 minute intervals had an average of 3.60% of Ethion.

EXAMPLE XIII

A combination product providing nitrogen, $K_2O$, and $P_2O_5$ as well as iron for use in areas where chlorosis is prevalent was prepared by blending fertilizer as described in Example II, ferrous ammonium sulfate, and a sticking agent in a zig-zag blender as described in Example IX. The batch was composed of:

| MATERIAL | WEIGHT |
| --- | --- |
| −8 +70 mesh 31-6-4 Fertilizer as described in Example II | 180 lbs |
| Ferrous ammonium sulfate (14.24 % (actual iron) | 8770 gms |
| Sticking agent (Polyvis OSH) | 14100 gms |

The blending condition and feed rates were:

| | |
| --- | --- |
| Fertilizer feed rate | 4 lbs/min. |
| Ferrous ammonium sulfate feed rate | 193 gms/min. |
| Sticking agent feed rate | 314 gms/min |
| Blender speed | 30 rpm |
| Blender orientation (feed end higher than discharge end) | 2° 22' |
| Retention time in blender | 6.15 mins. |

The resulting combination product had a bulk density of 34.1 lbs/cu.ft. Ninety-eight and two-tenths (98.2) percent of the product was of the desired −8 +70 mesh particle size. Samples taken at four minute intervals had an average of 1.27% of ferrous ammonium sulfate.

Referring again to the drawing, FIG. 2 depicts a system 50 in accord with the principles of the present invention for producing foamed urea-formaldehyde fertilizers and combination products by the novel process just described. For the most part the components of system 50 are commercially available items and their details are not critical as far as the present invention is concerned. These components will accordingly only be described to the extent necessary for an understanding of the present invention.

System 50 includes among its major components two kettles 52 and 54 in which the solution of methylol ureas is prepared. These kettles preferably have jackets 56 as shown in FIG. 2A through which steam can be circulated from lines 58 to maintain the solution at the selected temperature. Kettles 52 and 54 are also equipped with agitators 60 shown diagrammatically in FIG. 2A.

In a typical version of the present invention such as that described above, water, solid urea, urea-formaldehyde concentrate, and a basic material such as sodium hydroxide are fed to the first kettle 52 from a urea-formaldehyde concentrate tank 62, a water supply such as tank 64, a urea surge bin 65, and a caustic tank 66. The rates of supply of the water and urea-formaldehyde concentrate are regulated as by metering pumps 68 and 69 to provide a controlled rate-of-flow so that the composition of the solution can be kept constant.

From surge bin 65 the urea flows into a gravimetric feeder 70 having a regulatable delivery rate so that the flow of urea to kettle 52 can also be closely controlled. As shown in FIG. 2A, the urea then flows from feeder 70 into kettle 52.

The caustic material (typically an aqueous solution of sodium hydroxide) is supplied to kettle 52 through a valve 72 so that a controlled flow of the caustic material to kettle 52 can be obtained.

Depending upon the details of the process, solubilization of the urea and formation of the methylol ureas solution may or may not be completed in kettle 52. If solubilization and methylol ureas formation are complete, the methylol ureas solution is delivered directly from kettle 52 to surge tank 74, which is provided to level out surges or fluctuations in the discharge from the kettle 52 or 54 from which it is supplied so that a constant throughout the system can be maintained.

In a typical application of the invention, however, solubilization and completion of the methylol ureas forming reactions cannot be completed in kettle 52 in a reasonable amount of time. In these circumstances kettle 54 is employed to provide additional hold-up time for solubilization of the urea and formation of the methylol ureas solution (caustic may also be added to kettle 54 in the manner described above to control the pH in this kettle).

More than two kettles may of course be employed, if desired, to increase the production rate of system 50. Also, surge tank 74 can be used to provide additional hold-up time for solubilization of the methylol ureas.

Referring again to the drawing, with kettle 54 in the system the overflow from kettle 52 flows into standpipe 76 in the kettle and through line 78 into kettle 54 where formation of the methylol ureas solution is completed. The solution then flows into a standpipe 80 in kettle 54 and through line 82 into the surge tank 74 mentioned above.

The methylol ureas solution in surge tank 74 may be delivered to one of two mixing kettles 84 and 86 provided with agitators 88 depending upon the final product being produced. If the product is a complete fertilizer constituent, the methylol ureas solution is first fed into mixing kettle 84 where a source of available $K_2O$ is mixed with it. A pump 90 having a regulatable delivery rate is preferably employed to transfer the solution to kettle 84 so that the rate-of-flow of the solution into the kettle can be accurately regulated.

The $K_2O$ source in the form of a finely divided particulate solid flows from a bin 92 onto a gravimetric feeder 94 and then into kettle 84. As in the case of the urea supply arrangement, a gravimetric feeder with a controllable delivery rate is preferably employed so that the rate-of-flow of the $K_2O$ source into the kettle can be accurately controlled.

Mixing kettle 84 produces a slurry of the methylol ureas solution and $K_2O$ material which is transferred at a controlled rate from kettle 84 to kettle 86 by a pump 96 having a regulatable delivery rate. If a complete fertilizer or a combination product employing a complete fertilizer is being produced, a source of available $P_2O_5$ such as Mon-A-Mon is mixed with the methylol ureas-$K_2O$ slurry in kettle 86. Also, a surfactant is mixed with the methylol ureas in mixer 86 for the purposes discussed above.

The Mon-A-Mon or other $P_2O_5$ source in finely divided particulate form is fed to mixer 86 from surge bin 97 by a gravimetric feeder 98. This feeder, like those discussed previously, will be of the controllable delivery rate type so that the rate-of-feed of the phosphate source to the mixing kettle can be accurately regulated.

Surfactant is supplied to mixing kettle 86 from a surge tank 100 by metering pump 102 to control the rate-of-supply of the surfactant. As is the case of the other constituents, accurate metering of the surfactant promotes uniformity in the final product as well as insuring that the product has the proper physical and chemical characteristics.

Referring again to FIG. 2, if the product being produced is a straight nitrogen fertilizer or a combination product employing a straight nitrogen fertilizer, the methylol ureas solution from kettle 54 (or kettle 52 if only one kettle is employed) is transferred directly to mixing kettle 86 by pump 90. Surfactant is added to and mixed with the methylol ureas solution in kettle 86 as in the case of a complete fertilizer, but the phosphate feeding equipment is not employed (in the production of a straight nitrogen fertilizer or a combination product employing such a fertilizer all of the components surrounded by dotted lines in the upper right-hand portion of FIG. 2A are unnecessary).

The discharge from kettle 86 is a slurry containing primarily methylol ureas, water, surfactant, and recycled fines in the case of a straight nitrogen fertilizer. If a complete fertilizer is being produced, the slurry will contain the $K_2O$ and $P_2O_5$ source materials.

If a product of relatively higher bulk density is being produced, the material discharged from kettle 86 is transferred by a pump 104 having a regulatable delivery rate directly to a reactor 106. On the other hand, if a product of relatively lower bulk density is being manufactured, the material discharged from kettle 86 is first transferred by pump 104 to a prefoamer 108 and then to reactor 106. In prefoamer 108 the material is agitated to promote cellular development. Any desired type of agitation device may be employed although an in-line mixer has been found to give good results.

To obtain an even greater reduction in bulk density of the final product, air may be introduced into the agitated material in prefoamer 108 from a suitable source 110 through an air line 112 in which a flow control 113 is disposed.

Figure 5:
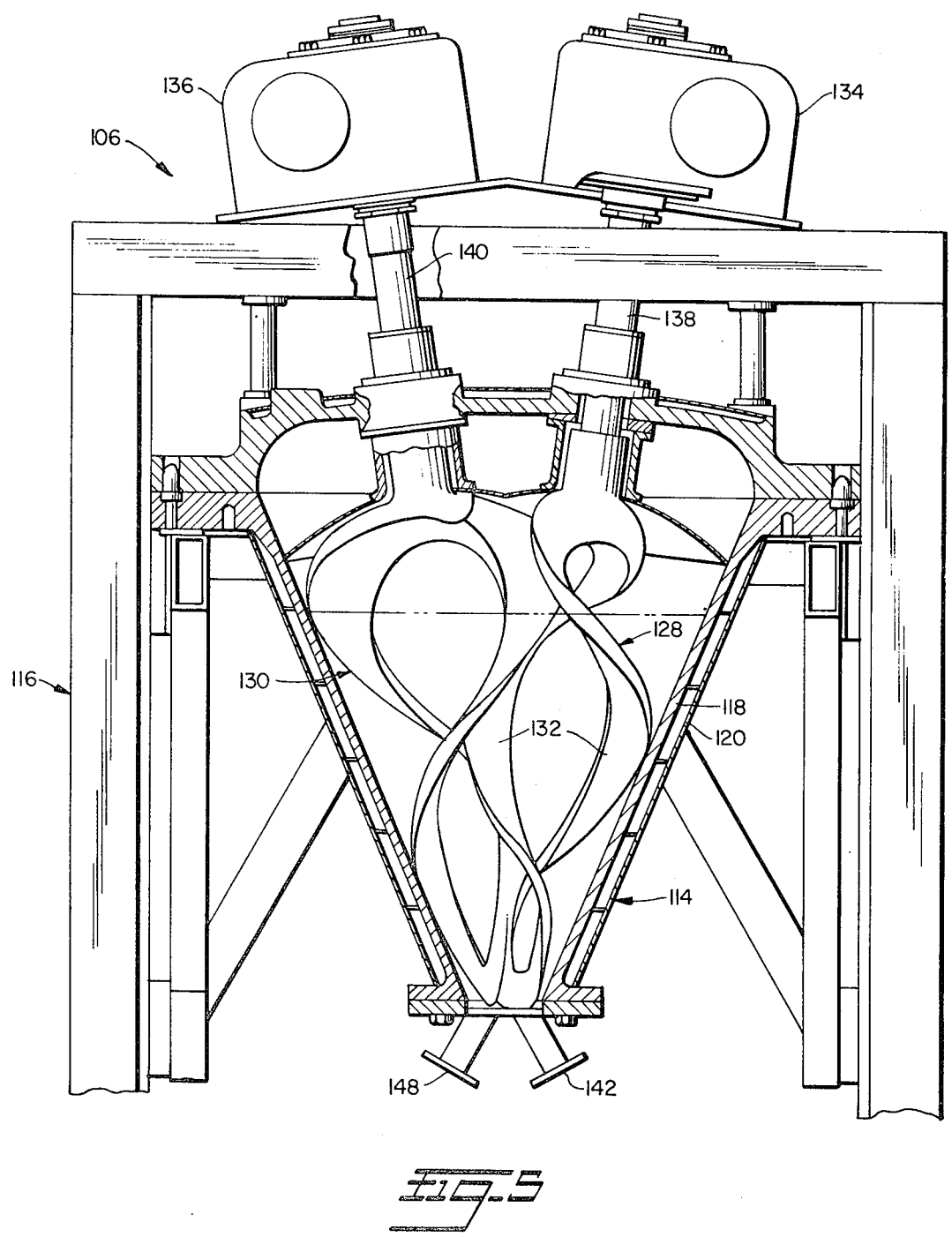
FIG. 5 is a section through the reactor.

Referring now to FIGS. 2A and 5, it is the function of reactor 106 to mix the acid catalyst with the methylol ureas solution. The reactor also keeps any additives mixed with the solution in mixing kettles 84 and 86 uniformly distributed throughout the solution during the addition of the acid catalyst.

The exemplary reactor 106 illustrated in FIG. 5 includes a conical vessel or mixing bowl 114 supported from a framework 116. Mixing bowl 114 has spaced inner and outer jackets 118 and 120 providing flow passages for a fluid heat transfer medium such as steam. And, even if steam is not employed, the insulation provided by the jacketed structure will assist in containing the heat of reaction so that the condensation reactions will proceed in a stable manner.

Disposed in mixing bowl 114 are two matched, intersecting mixing elements or beaters 128 and 130, each composed of two members 132 in the form of convergent helices. Beaters 128 and 130 are rotated at identical speed in the opposite direction by motors or drives 134 and 136, which are connected to the beaters by shafts 138 and 140.

The methylol ureas solution is introduced into the bottom of reactor 106 through inlet 142. The acid catalyst is transferred to the reactor from an acid tank 144 by metering pump 146 and introduced into the bottom end of the reactor through inlet 148.

Reactors of the type just described are disclosed in more detail in U.S. Pat. No. 3,226,097 issued Dec. 28, 1965, to Vayda for MIXER, which is hereby incorporated herein. Reference may be had to this patent if deemed necessary for an understanding of the present invention.

Other reactors of the intersecting beater type may be substituted for the reactor just described if desired. Other types of mixers will generally not prove satisfactory, however, because the urea-formaldehyde material will build up in the mixer to an unacceptable extent.

Referring now to FIGS. 2A and 4–9, the discharge from reactor 106 is a more-or-less viscous material consisting of partially condensed methylol ureas, water, surfactant, and any materials which may have been mixed with the methylol ureas in mixing kettles 84 and 86. This material is discharged through a swinging or oscillating distributor 150 onto the feed end of an endless curing belt or conveyor 152 in curing section 154. As the material moves along the curing belt, the condensation reactions proceed, and the material separates into granules and lumps as discussed above.

Referring now specifically to FIGS. 6–9, curing belt 152 is trained around rolls 156 and 158 to provide a material bearing leg 160 and a return leg 162 guided by idler rollers 164. One (or both) of the rollers 156 and 158 is driven from a suitable power source (not shown) to effect continuous movement of belt 152.

As best shown in FIG. 7, belt 152 is deformed into a trough-like configuration at its feed end to provide side walls 166 by inclined side rolls 168. These rolls also combine with horizontal roll 170 to support the material carrying leg 160 of the belt at the feed end of the conveyor.

Intermediate its ends the material carrying leg 160 of the belt is similarly supported by a horizontal central roll 172 and side rolls 174. Side rolls 174 are, however, inclined at a less steep angle than side rolls 168. Accordingly, belt side walls 166 become less steeply inclined as they progress from the feed end toward the middle of the conveyor.

This progressive flattening of the material carrying belt leg 160 is continued toward the discharge end of the conveyor where the leg is supported by a single horizontal roll 176. This arrangement is of importance in that it promotes the self-granulating tendency of the material being cured thereon and the separation of the material from the belt.

In addition to the components just discussed, the curing section 154 includes a fume or vapor hood 178 surrounding distributor 150. At the end of hood 178 is a transversely extending seal 182 (see FIGS. 6 and 7) which prevents material from flowing off the left-hand end of the conveyor as shown in FIG. 6.

Referring now specifically to FIG. 6, a delumper 184 is positioned at the discharge end of conveyor belt 152 to separate lumps of cured material into granules as discussed above. Delumper 184 consists elongated elongate rods or members 186 extending transversely across the upper leg 160 of conveyor belt 152 between end plates 188 (only one of which is shown). The assembly of rods and end plates is fixed to a transversely extending shaft 190 which is rotated by an appropriate motor (not shown) in the direction indicated by arrow 192 in FIG. 6. As the shaft rotates, members 186 strike and break up any lumps of material on the material carrying leg of the curing belt.

With continued reference to FIG. 6, it was pointed out above the cured material discharged from the curing section has a certain degree of tackiness. A doctor knife 198 is accordingly employed at the discharge end of the belt to remove adherent material. The doctor knife is mounted on a transversely extending pivot member 200 and has a weighted arm 202 to maintain the scraping edge 204 of the knife in contact with the return leg 162 of the conveyor belt.

Disposed in series with doctor knife 198 to further clean the return leg of the conveyor belt is a belt cleaner 205. Product removed from the belt by cleaner 205 is re-introduced into the system for further processing by a suitable conveyor arrangement (not shown) as it represents a significant amount of material (typically on the order of one percent based on weight of raw materials).

Cleaner 205 is followed by a belt washer 206, including a transversely extending header 207 and nozzles 208 spaced at intervals along the header. Water from a suitable source, (not shown) is supplied to header 207 and sprayed at high velocity through nozzles 208 against the return leg 162 of the conveyor belt to wash any remaining adherent material therefrom. The belt is then dried by a squeegee 210. This device is mounted on a transversely extending pivot member 212 and is provided with a counterweight 214 to maintain it in firm engagement with the lower run of the belt.

The components of washer 206 just described are surrounded by a casing 216 having an outlet 218 for the cleaning water and material washed from the belt. As discussed above, this material, which will typically include a significant proportion of urea-formaldehyde compounds, may be employed as a binding agent for fines produced in the manufacturing process.

Referring now specifically to FIGS. 2B and 4, the cured material is discharged from curing belt 152 onto a spreading or feed conveyor 220 consisting of an endless belt 222 trained around rollers 224 and 226, at least one of which is motor-driven. Conveyor 220 transfers the cured material to a dryer 228, where the moisture content of the material is reduced to on the order of 4 percent or lower as discussed above. There are several different types of dryers which may be employed. That which is illustrated includes a casing 230 through which the material to be dried travels on a continuous apron conveyor 232, which is cleaned by a washer 233. As the material passes through the dryer, it is dried by air heated via gas-fired burners and circulated through the dryer casing 230 by suitable blowers (not shown). Dryer 228 is divided into three zones identified as 234$a$, 234$b$, and 234$c$ (a larger (or smaller) number of drying zones can of course be employed, if desired). The temperature in each of these zones can be independently regulated to produce the optimum drying conditions discussed above.

Several companies make dryers of the type described above, and any of these may be employed. Among these manufacturers is the National Drying Machinery Company.

The dried product is discharged from dryer 228 into an elevator 236 which conveys it to a series of Tyler or similar screens 238 where oversize and undersize particles are screened from the material. Oversize particles are delivered from screens 238 to a mill 240 to reduce them in size. A cage mill or one of similar type is preferably employed. This type of mill produces a shattering as opposed to grinding type action, and it has been found that such action tends to separate oversize particles into the granules of which they are composed with minimal breaking up of individual granules. Accordingly, the necessary reduction in size can be obtained with minimum production of fines.

From mill 240 the comminuted product is returned to elevator 236 as indicated by diagrammatically illustrated conveyor 242. The milled product is accordingly recirculated to screens 238 for further classification.

Referring again to FIG. 2B, the fines separated by screens 238 are transferred to a surge bin 244 through a diagrammatically illustrated conveyor identified by reference character 246. Properly sized particles, are preferably transferred from screens 238 to an air classifier 248. The air classifier removes fines which do not pass through the finest mesh screens 238 because of the accumulation of material in the openings through the latter.

As an alternate, if desired, screens 238 may in many cases be eliminated and the air classifier used by itself for the separation of oversize and undersize material.

In the case of straight nitrogen and complete fertilizers the material discharged from air classifier 248 is the finished product. This is delivered to suitable packaging apparatus (not shown) by a diagrammatically shown conveyor arrangement identified by reference character 250.

The fines separated in air classifier 248 are combined with those separated by screens 238 as shown in FIG. 2B and delivered to surge bin 244 with the latter. The fines in surge bin 244 are blended with a binding agent as described above to increase the particle size in an agglomerator identified by reference character 252 in FIG. 2B. The agglomerator will typically be a Patterson-Kelly twin shell blender or a paddle mixer although other types of mixers may be employed, if desired.

The fines are fed to agglomerator 252 from surge bin 244 at a controlled rate by a gravimetric or other feeder 254. If the discharge from curing belt washer 206 is employed as a binding agent, the latter is transferred to the agglomerator, also at a controlled rate, by a metering pump or other feed control 256. This insures that the fines and binding agent in the agglomerator will be in the proper ratio.

It is of course not necessary that the washer discharge be used as the binding agent. Instead, as discussed above, water alone, a urea-formaldehyde solution, or a combination of the latter with water from a different source may be employed as a binding agent. If one of these agents is selected, it is fed to agglomerator 252 from a surge tank 258 by a metering pump or other feed control 260, again to insure that the supply of binding agent to the agglomerator is properly proportioned to the supply of fines.

The agglomerated material is fed from agglomerator 252 by a conveyor identified by reference character 262 to spreader conveyor 220. Here it is combined with particulate material delivered to the dryer from curing section 154 for processing in the manner described above.

The system is employed as described above for the manufacture of all fertilizer products except for straight nitrogen (N-O-O) fertilizers. In making these, the condensation reactions are initiated in the prefoamer 108 and the material is then transferred directly from the prefoamer to curing section 154.

The system employed in the manufacture of combination products is the same except for an arrangement for blending other active ingredients and a sticking agent with the fertilizer product after it has been produced in the manner just described.

More specifically, in the manufacture of combination products the fertilizer particles are transferred to a surge bin 264 from which they are fed at a controlled rate as by a gravimetric feeder 266 to blender 268. This blender will typically be a Patterson-Kelly liquids-solids zig-zag blender or the equivalent.

The active ingredient and sticking agent are similarly fed to blender 268 at a controlled rate to maintain the proper proportions of the ingredients in the blender. More particularly, the sticking agent is fed to blender 268 from a surge kettle 270 as by a metering pump 272. The exemplary system illustrated in FIG. 2B is depicted as including a surge bin 274 from which an active ingredient is transferred to blender 268 as by gravimetric feeder 276. This arrangement is employed if the material being added is in solid form. If it is a liquid, a surge kettle and metering pump are instead employed.

Depending upon the constituents blended with the particulate fertilizer in blender 268, there may be a tendency toward agglomeration. Accordingly, when some products are being made, the blended material is preferably passed over a screen 278 to remove oversize particles, which may be crushed and reclassified in a manner similar to that described above. Properly sized particles of the finished blended product are transferred to appropriate packaging apparatus (not shown).

Referring again to FIG. 2B, it is preferable in some cases to preblend the added active ingredient or ingredients and the sticking agent (or a conditioning agent or other material) and then mix this preblend with the particulate fertilizer. In a typical operation of this type, the preblend rather than the active ingredient per se will be supplied to blender 268 from surge bin 274.

The system components employed for making the preblend will typically include a surge bin 280 for the active ingredient (or a surge tank if it is a liquid), which is transferred from the surge bin to a blender 282 at a controlled rate as by a gravimetric feeder 284 (or a metering pump in the case of a liquid material). The sticking agent is transferred to blender 282 from a surge tank 286 as by a metering pump 288. These and-/or other materials to be incorporated in the preblend are blended in blender 282 and then transferred to surge bin 274 (or a surge tank if the preblend is a liquid) for feeding to blender 268 in the manner described above.

Figure 3:
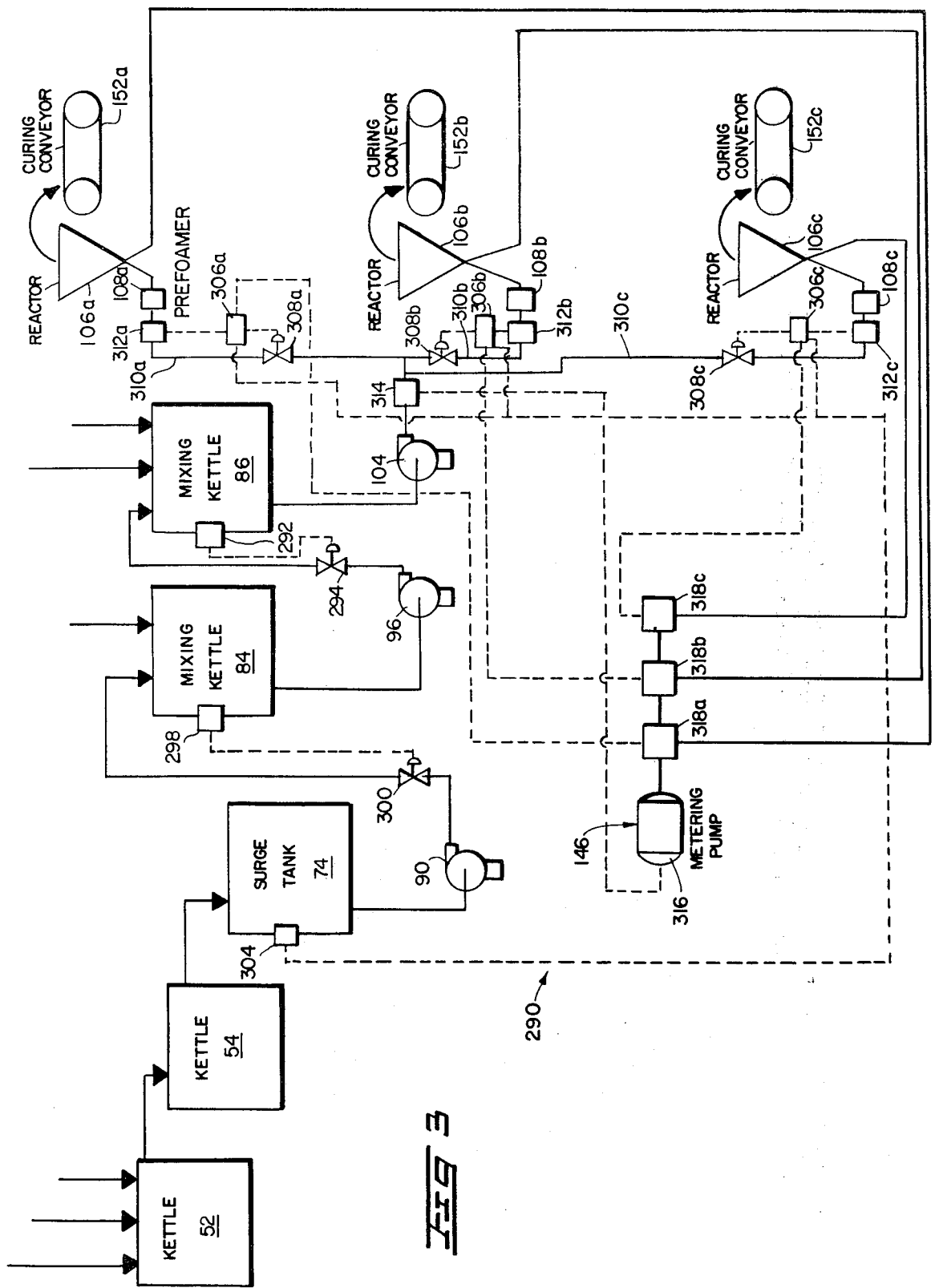
FIG. 3 is a schematic illustration of a control system for the apparatus of FIG. 2.

Referring again to the drawing, FIG. 3 depicts the important components of a control system 290 employed to insure proper operation of the apparatus illustrated in FIG. 2 and described above. The two major functions of the illustrated components of control system 290 are to maintain a constant throughput of the methylol ureas solution through the reactors and to control the pH of the material in the reactors. A constant throughput rate is necessary to maintain stable conditions in the system. Close regulation of the pH in the reactors is necessary since only minor variations in this pH will cause significant changes in the properties of the final product (the pH is preferably maintained within $\pm 0.2$ of the desired level).

The major components employed to maintain a constant throughput through the system include a level control 292 in mixing kettle 86, which controls the operation of a valve 294 in the conduit between mixing kettles 84 and 86, and a level control 298 in mixing kettle 84, which controls a valve 300 in the conduit between surge tank 74 and mixing kettle 84. Another major component is a level control 304 in the surge tank, which is connected to flow controllers 306 $a$–$c$. These regulate the operation of valves 308 $a$–$c$ in the supply lines 310 $a$–$c$ to reactors 106 $a$–$c$.

In a typical commercial scale operation plural reactors will typically be employed to provide adequate capacity rather than a single reactor is illustrated in FIG. 2. FIG. 3 illustrates the connection of multiple reactors into a system of the type shown in FIG. 2. The number of reactors may of course be different from that shown.

Should the throughput rate increase above the desired rate, the level of the material in mixing kettle 86 will drop. Level control 292 will then open valve 294 to increase the flow of material to the kettle and thereby restore the material to the proper level. This, in turn, will cause a decrease in the level in mixing kettle 84, which will be detected by level control 298. Level control 298 will accordingly open valve 300 to increase the flow from surge tank 74 to kettle 84. Similarly, this will decrease the level in the surge tank, which will be detected by level control 304. This level control will accordingly transmit a signal to flow controllers 306 $a$–$c$, which will cause them to restrict valves 308 $a$–$c$, thereby reducing the rate-of-flow of material from mixing kettle 86 to reactors 106 $a$–$c$.

A similar restorative action will occur if the throughput rate drops below the desired level. In this case, however, valves 308 $a$–$c$ are opened wider by controllers 306 a–c to increase the throughput rate to the desired level.

Flow controllers 306 a–c also receive inputs from flow meters 312 a–c in reactor supply lines 310 a–c. These inputs cause the flow controllers to independently regulate valves 308 a–c so as to divide the flow from kettle 86 into a number of uniform streams equalling the number of reactors despite varying flow conditions to and in the reactors.

The control components employed to regulate the pH of the material in the reactors include a pH detector or sensor 314 on the downstream side of pump 104. Sensor 314 is connected to and controls the speed of acid pump motor 316. If the pH of the discharge from pump 104 increases, sensor 314 speeds up motor 316, increasing the flow of the acid catalyst to the reactors. On the other hand, if the pH decreases below the desired level, sensor 314 decreases the speed of the pump motor to reduce the flow of catalyst to the reactors. By this arrangement, accordingly, the flow of catalyst to the reactors can be varied as the pH of the mixing kettle discharge changes in such a fashion as to maintain the pH in the reactors at a constant level.

In addition to the foregoing, provision is also preferably made for correlating the flow of acid to each reactor to the rate-of-flow of the urea-formaldehyde material through it to even more accurately control the pH in each reactor. This is accomplished by inputs from flow controllers 306 a–c to the heads 318 a –c of pump 146. Since each flow controller has an input from the associated flow meter 312, the signal to the associated head 318 can accordingly be made indicative of the rate-of-flow of urea-formaldehyde solution to the associated reactor.

Control system 290 of course includes other components for regulating the feed of material to the various system components, for maintaining such components at specified temperatures, etc. However, such controls are in main part conventional and operate in their normal manner. It is accordingly not believed necessary to describe them in detail herein.

It will be apparent to those skilled in the arts to which the present invention relates that many modifications may be made in the process and apparatus as described above and in the specifics of the products which are produced without exceeding the scope of the present invention. Accordingly, to the extent that such variations are not excluded from the appended claims, they are fully intended to be covered therein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for producing a self-granulated, foamed, particulate, urea-formaldehyde fertilizer comprising:
   a. means for preparing a foamed urea-formaldehyde solution in which the urea and formaldehyde are at least partially condensed to methylol ureas;
   b. means for curing the methylol ureas to predominantly methylene ureas while simultaneously expanding said solution and for then drying said foamed solution to a self-granulated, solid material;
   c. means for comminuting the dried material to thereby reduce said material to particulate form; and
   d. means for blending adjuvants and other constituents with said dry, particulate material.

2. Apparatus for producing a foamed, particulate, self-granulated, urea-formaldehyde fertilizer, comprising:
   a. means for preparing a urea-formaldehyde solution in which the urea and formaldehyde are at least partially condensed to methylol ureas;
   b. means for adding to the solution a material capable of promoting the formation of a self-granulating structure in a urea-formaldehyde foam;
   c. means for thereafter foaming said solution;
   d. means for curing said methylol ureas to predominantly methylene ureas while simultaneously expanding said solution and for then drying said foamed solution into a self-granulated, generally non-agglomerative material;
   e. means for discharging the foamed solution onto said curing means; and
   f. means for comminuting the dried material without material destruction of its granular structure to thereby reduce said material to particulate form.

3. Apparatus for producing a foamed, self-granulated, particulate, urea-formaldehyde fertilizer, comprising:
   a. means for preparing a foamed urea-formaldehyde solution in which the urea and formaldehyde are at least partially condensed to methylol ureas;
   b. curing means for so expanding said solution while condensing the methylol ureas in the solution to predominantly methylene ureas as to produce a physically, handleable, self-granulated material;
   c. means for discharging said urea-formaldehyde solution from said first-mentioned means onto said curing means;
   d. said curing means comprising an endless belt, means at the end thereof onto which the solution is discharged for forming said belt into a trough-like configuration to thereby retain on said belt the material discharged thereonto, and means for regulating the depth of the layer of material on said belt; and
   e. said apparatus also including means for drying the physically handleable, urea-formaldehyde material and means for reducing the dried material to particulate form.

4. The apparatus of claim 3, wherein the side wall portions of the belt provided by the trough-like deformation thereof have an inclination which decreases from the feed end to the discharge end of the belt to thereby effect a breaking up of the material on said belt as said material assumes a physically stable structure and moves to the discharge end of said belt.

5. Apparatus for producing a foamed, self-granulated, urea-formaldehyde fertilizer, comprising:
   a. means for preparing a foamed urea-formaldehyde solution in which the urea and formaldehyde are at least partially condensed to methylol ureas;
   b. means for curing the methylol ureas in the foamed solution to predominantly methylene ureas while simultaneously expanding said foamed solution and for then drying said foamed solution to a self-granulated, solid material, said means comprising an endless belt onto which said urea-formaldehyde solution material is adapted to be discharged;

c. means for discharging said foamed solution from said first mentioned means onto said belt at one end thereof;

d. means at the opposite, discharge end of said belt for separating cured material therefrom;

e. cleaning means in series with said last-mentioned means for cleaning said belt to remove therefrom material which is not separated by said last-mentioned means; and f. means for recovering material removed from said belt by said cleaning means.

6. Apparatus for producing a self-granulated, foamed, urea-formaldehyde fertilizer, comprising:

a. means for preparing a foamed urea-formaldehyde solution in which the urea and formaldehyde are at least partially condensed to methylol ureas;

b. means for curing the methylol ureas in said foamed solution to predominantly methylene ureas while expanding said foamed solution, said means comprising conveyor means onto which said urea-formaldehyde solution is adapted to be discharged;

c. means for discharging said foamed solution from said first-mentioned means onto said conveyor means at one end thereof;

d. means at the opposite end of said conveyor means for delumping the cured material to facilitate the drying thereof; and e. means for drying said material subsequent to the delumping thereof.

7. The apparatus of claim 6, wherein said conveyor means comprises a curing belt and said delumping means comprises:

a. a circular array of parallel, elongated members;

b. means joining said members into a unitary assembly;

c. means rotatably supporting said assembly with the periphery thereof closely adjacent the upper surface of said curing belt and with said elongated members extending transversely of said belt; and d. means for rotating said assembly.

8. Apparatus for preparing a foamed, self-granulated, particulate, urea-formaldehyde fertilizer, comprising:

a. a first mixing means for preparing a solution of urea and formaldehyde in which the urea and formaldehyde are at least partially condensed to methylol ureas;

b. a second mixing means;

c. flow means for transferring said solution from said first mixing means to said second mixing means, said flow means including means having a sensor responsive to the level in said second mixing means for so controlling the volume of flow of said solution from said first mixing means to said second mixing means as to maintain the liquid level in said second mixing means substantially constant;

d. means for introducing at least one adjuvant into said second mixing means for blending with said methylol ureas solution;

e. means for foaming the material discharged from said second mixing means;

f. means for acidifying said material to initiate condensation of said methylol ureas;

g. means for curing the methylol ureas in said acidified, foamed material to predominantly methylene ureas while expanding said foamed material and for then drying said solution to a self-granulated, solid material; and h. means for reducing said solid material to particulate form.

9. The apparatus of claim 8, together with:

a. a third mixing means interposed between and in fluid communication with said second mixing means and said foaming means, whereby the material discharged from said second mixing means flows into said third mixing means;

b. means for adding at least one additional adjuvant to said material in said third mixing means to effect a dispersion of the adjuvant in the material before it is foamed; and c. flow control means including a sensor responsive to the level in said third mixing means for so regulating the flow of material from said second mixing means into said third mixing means as to maintain the level of said material in said third mixing means substantially constant.

10. Apparatus for preparing a self-granulated, foamed, particulate, urea-formaldehyde fertilizer, comprising:

a. at least one agitated mixer for preparing a solution for urea and formaldehyde in which the urea and formaldehyde are at least partially condensed to methylol ureas;

b. a surge tank;

c. means for delivering said solution from said mixer to said surge tank;

d. means for adding an acidic material to said solution downstream of said surge tank to effect the condensation of said methylol ureas;

e. an agitated reactor in fluid communication with said surge tank;

f. means responsive to the level of the solution in said surge tank for so controlling the flow of said solution from said surge tank to said reactor as to keep the rate of flow into said reactor at a substantially constant ratio relative to the rate of flow of solution into said surge tank from said mixer to thereby compensate for variations in the feed rates of the constituents of said solution;

g. means operatively connected to the discharge side of said reactor for receiving and curing the methylol ureas in the foamed solution to predominantly methylene ureas while expanding said foamed material to a self-granulated material;

h. means for drying the cured material; and i. means for reducing the dried material to particulate form.

11. The apparatus of claim 10, wherein:

a. there are a plurality of reactors as aforesaid connected in parallel to said surge tank; and b. said flow controlling means further comprises a conduit means communicating with each of said reactors, a flow controlling valve in each of said conduit means, and means associated with each of said valves including a flow meter in the conduit means for so adjusting the valve as to normally maintain a predetermined rate of flow of the solution into the reactor associated therewith; and c. said level responsive means being so connected to said flow meters as to vary said predetermined flow rate as the level in the surge tank varies.

12. Apparatus for preparing a foamed, self-granulated, particulate, urea-formaldehyde fertilizer, comprising:

a. mixing means for preparing a solution of urea and formaldehyde in which the urea and formaldehyde are at least partially condensed to methylol ureas;

b. an agitated reactor in which said methylol ureas are adapted to be at least partially condensed to methylene ureas and said solution foamed;

c. means for introducing an acidic material into said reactor to reduce the pH of said solution and thereby initiate the condensation of said methylol ureas;

d. control means including a first sensor responsive to the pH of the solution discharged from said mixing means and a second sensor responsive to the volume of solution entering the reactor for controlling the flow of acidic material to said reactor and thereby controlling the pH to which the solution is reduced by the addition of the acidic material thereto;

e. means operatively connected to the discharge side of said reactor for receiving and curing the methylol ureas in said foamed, acidified material to predominantly methylene ureas while expanding said foamed acidified material and for then drying the expanded material to a self-granulated material; and f. means for reducing the dried material to particulate form.

13. The apparatus of claim 12:

a. wherein there are a plurality of agitated reactors as aforesaid;

b. there is a single first sensor as aforesaid and means regulated thereby for controlling the total volume of acidic material introduced into said reactors; and c. there is associated with each of said reactors an independently operable second sensing means as aforesaid and a metering means controlled thereby for controlling the flow of acidic material into the associated reactor.

14. Apparatus for producing a foamed, self-granulated, particulate, urea-formaldehyde fertilizer, comprising:

a. means for preparing a foamed urea-formaldehyde solution in which the urea and formaldehyde are at least partially condensed to methylol ureas;

b. means for curing the methylol ureas in said foamed solution to predominantly methylene ureas while expanding said solution and for then drying said foamed solution to a self-granulated, solid material;

c. means for discharging said solution from said first-mentioned means onto said curing means;

d. means for comminuting the dried material to thereby reduce said material to particulate form;

e. means for classifying said particulate material and separating fines therefrom; and f. means for agglomerating said fines and returning the agglomerated fines to the product stream.

15. The apparatus of claim 14, wherein the means for agglomerating the fines comprises means for supplying a binder, means for delivering said fines, and means for mixing said fines with said binder.

16. The apparatus of claim 14, together with:

a. cleaning means for washing residue from said curing means; and b. wherein the means for agglomerating said fines comprises:

1. a blender means;

2. means for delivering said fines to said blender means; and 3. means for delivering the mixture of water and urea-formaldehyde resin residue from said washing means to said blender means for use as a binder in the agglomeration of said fines.

17. Apparatus for producing a self-granulated, foamed, particulate, urea-formaldehyde fertilizer comprising:

a. means for preparing a foamed urea-formaldehyde solution in which the urea and formaldehyde are at least partially condensed to methylol ureas;

b. means for curing the methylol ureas to predominantly methylene ureas while simultaneously expanding said solution and for then drying said foamed solution to a self-granulated, solid material;

c. means for comminuting the dried material to thereby reduce said material to particulate form;

d. a first means for blending adjuvants and other constituents with said dry, particulate material;

e. a second blending means;

f. means for supplying at least one adjuvant to said second blending means;

g. means for supplying a liquid sticking agent to said second blending means for blending with said adjuvant; and h. means for transferring the adjuvant-sticking agent material from said second blending means to the first-mentioned blending means for blending with the dry, particulate fertilizer material.

18. Apparatus for preparing a self-granulated, foamed, particulate, urea-formaldehyde fertilizer, comprising:

a. a heated agitated vessel;

b. means for supplying a urea-formaldehyde concentrate and solid urea to said vessel for at least partial solubilization of said urea and at least partial conversion of the urea and formaldehyde to methylol ureas;

c. means for adding an acidic material to the urea-formaldehyde solution discharged from said vessel to initiate the condensation of said methylol ureas to methylene ureas;

d. a first mixing means interposed between said agitated vessel and said acidic material adding means and in fluid communication therewith, whereby the solution discharged from said vessel flows into said mixing means;

e. means for supplying at least one adjuvant to said mixing means, whereby said adjuvant is dispersed throughout said solution before the condensation of the urea and formaldehyde therein;

f. a second mixing means interposed between said first mixing means and said acidic material adding means and in fluid communication therewith, whereby the solution discharged from said first mixing means flows into said second mixing means;

g. means for effecting prefoaming of said solution in said last-mentioned mixing means;

h. means for foaming said acidified solution;

i. means for curing the methylol ureas in the foamed solution to predominantly methylene ureas while expanding said foamed solution and for then drying said solution to a self-granulated, solid material; and j. means for reducing the dried material to particulate form.

19. The apparatus of claim 18, wherein said means for effecting prefoaming comprises means for introducing a gas into said last-mentioned mixing means.

20. The apparatus of claim 18, wherein said means for effecting prefoaming comprises means for agitating the solution in said last-mentioned mixing means.

21. Apparatus for producing a self-granulated, foamed, particulate, urea-formaldehyde fertilizer, comprising:
   a. means for preparing a foamed urea-formaldehyde solution in which the urea and formaldehyde are at least partially condensed to methylol ureas;
   b. means for curing the methylol ureas in the foamed solution to predominantly methylene ureas while expanding said foamed solution and for then drying said solution to a self-granulated solid material;
   c. means for comminuting the dried material to thereby reduce said material to particulate form;
   d. means for blending adjuvants and other constituents with said dry, particulate material;
   e. means for introducing the dry particulate material and the constituent or constituents to be added thereto into the blending means; and
   f. means for introducing a liquid sticking agent into said blending means to effect adherence of the added constituent or constituents to the particles of urea-formaldehyde fertilizer.

22. Apparatus for preparing a foamed, self-granulated, particulate, urea-formaldehyde fertilizer, comprising:
   a. a heated agitated vessel;
   b. means for supplying a urea-formaldehyde concentrate and solid urea to said vessel for at least partial conversion of the urea and formaldehyde to methylol ureas;
   c. means for adding an acidic material to the urea-formaldehyde solution discharged from said vessel to initiate the condensation of said methylol ureas to methylene ureas;
   d. mixing means interposed between said agitated vessel and said acidic material adding means and in fluid communication therewith, whereby the solution discharged from said vessel flows into said mixing means;
   e. means for supplying at least one adjuvant to said mixing means, whereby said adjuvant is dispersed throughout said solution before the condensation of the urea and formaldehyde therein;
   f. means for controlling the temperature in said mixing means as the mixture of adjuvant and urea-formaldehyde solution is formed;
   g. means for foaming said acidified solution;
   h. means for curing the methylol ureas in said foamed solution predominantly to methylene ureas while expanding said foamed solution and for then drying said foamed solution to a self-granulated solid material; and
   i. means for reducing the dried material to particulate form.

23. Apparatus for preparing a foamed, self-granulated, particulate, urea-formaldehyde fertilizer, comprising:
   a. a heated agitated vessel;
   b. means for supplying a urea-formaldehyde concentrate and solid urea to said vessel for at least partial solubilization of said urea and at least partial conversion of the urea and formaldehyde to methylol ureas;
   c. means for mixing first a source of $K_2O$ and then a source of $P_2O_5$ with said methylol ureas solution;
   d. means for foaming the resulting mixture;
   e. means for curing the methylol ureas in said mixture to predominantly methylene ureas while expanding said mixture and for then drying said mixture to a self-granulated, solid material; and
   f. means for reducing the dried material to particulate form.

24. Apparatus for preparing a foamed, self-granulated, particulate, urea-formaldehyde fertilizer, comprising:
   a. a heated agitated vessel;
   b. means for supplying a urea-formaldehyde concentrate and solid urea to said vessel for at least partial solubilization of said urea and at least partial conversion of the urea and formaldehyde to methylol ureas;
   c. means for mixing with said solution one or more additives which are sources of $K_2O$ or $P_2O_5$ or both;
   d. means for milling said additive or additives before they are added to the methylol ureas solution to thereby facilitate the control of the pH of the resulting mixture and the uniform distribution of the additive or additives therein;
   e. means for foaming the mixture;
   f. means for curing the methylol ureas in said mixture to predominantly methylene ureas while expanding said mixture and for then drying said mixture to a self-granulated solid material; and
   g. means for reducing the dried material to particulate form.

* * * * *

UNITED STATES PATENT OFFICE
CERTIFICATE OF CORRECTION

Patent No. 3,989,470                    Dated November 2, 1976

Inventor(s) Richard H. Czurak and Robert M. Thompson

It is certified that error appears in the above-identified patent and that said Letters Patent are hereby corrected as shown below:

Column 1, line 7, after U.S. Patent No. 3,705,794 add --issued December 12, 1972.--

Column 1, line 24, change "2,231,363" to read --3,231,363--

Column 1, line 32, change "ureaformaldehyde" to read --urea-formaldehyde--

Column 3, line 13, change "ocur" to read --occur--

Column 6, line 59, change "requires" to read --required--

Column 9, line 15, change "ureafor-" to read --urea-for- --

Column 10, line 41, change "and" to read --are--

Column 14, line 66, change "ater" to read --water--

Column 15, line 42, change "sample" to read --samples--

Column 17, line 13, change "preblended" to read --preblend--

Column 17, line 57, change "condition" to read --conditions--

Column 18, line 50, change "throughout" to read --throughput through--

Column 21, line 26, after "consists" insert --of--

Column 21, line 27, delete "elongate"

Signed and Sealed this

Eleventh Day of January 1977

[SEAL]

Attest:

RUTH C. MASON
Attesting Officer

C. MARSHALL DANN
Commissioner of Patents and Trademarks